United States Patent
Kim et al.

(10) Patent No.: US 11,961,281 B1
(45) Date of Patent: Apr. 16, 2024

(54) TRAINING AND USING COMPUTER VISION MODEL FOR ITEM SEGMENTATIONS IN IMAGES

(71) Applicant: Amazon Technologies, Inc., Seattle, WA (US)

(72) Inventors: Taewan Kim, Seattle, WA (US); Jesse Norman Clark, Ascot Vale (AU); Onkar Jayant Dabeer, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 17/545,119

(22) Filed: Dec. 8, 2021

(51) Int. Cl.
*G06V 10/774* (2022.01)
*B25J 9/16* (2006.01)
*G06V 10/75* (2022.01)
*G06V 10/764* (2022.01)
*G06V 20/64* (2022.01)

(52) U.S. Cl.
CPC ............ *G06V 10/774* (2022.01); *B25J 9/163* (2013.01); *B25J 9/1697* (2013.01); *G06V 10/75* (2022.01); *G06V 10/764* (2022.01); *G06V 20/64* (2022.01)

(58) Field of Classification Search
CPC .... G06V 10/225; G06V 10/898; G06V 10/88; G06V 7/41; G06T 7/74
See application file for complete search history.

(56) References Cited

U.S. PATENT DOCUMENTS

| | | | | |
|---|---|---|---|---|
| 6,401,078 B1* | 6/2002 | Roberts | ................. | G06Q 10/10 |
| | | | | 705/28 |
| 7,505,309 B2* | 3/2009 | Liu | ..................... | G11C 13/0011 |
| | | | | 365/63 |
| 8,620,026 B2* | 12/2013 | Datta | .................... | G06V 20/47 |
| | | | | 382/103 |
| 9,020,634 B2* | 4/2015 | Bailey | ................... | B65G 15/00 |
| | | | | 209/584 |
| 9,799,124 B2* | 10/2017 | Taylor | .................... | G06T 7/536 |
| 10,779,472 B2* | 9/2020 | Robertson | ............. | G06V 20/10 |

\* cited by examiner

*Primary Examiner* — Yosef Kassa
(74) *Attorney, Agent, or Firm* — Kirkpatrick Townsend & Stockton LLP

(57) ABSTRACT

Techniques for training a machine-learning model are described. In an example, a computer generates a first pseudo-label indicating a first mask associated with a first object detected by a first machine-learning model in a first training image. A transformed image of the first training image can be generated using a transformation. Based on the transformation, a second pseudo-label indicating a second mask detected in the transformed image and corresponding to the first mask can be determined. A second machine-learning model can be trained using the second pseudo-label. The trained, second machine-learning model can detect a third mask associated with a second object based on a second image.

20 Claims, 15 Drawing Sheets

TRAINING AND USING COMPUTER VISION MODEL FOR ITEM SEGMENTATIONS IN IMAGES

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space and equipment can result in lower throughput, unacceptably long response times, an ever-increasing backlog of unfinished or incorrectly finished tasks, and, in general, poor system performance.

BRIEF DESCRIPTION OF THE DRAWINGS

Various embodiments in accordance with the present disclosure will be described with reference to the drawings, in which.

DETAILED DESCRIPTION

Figure 1:
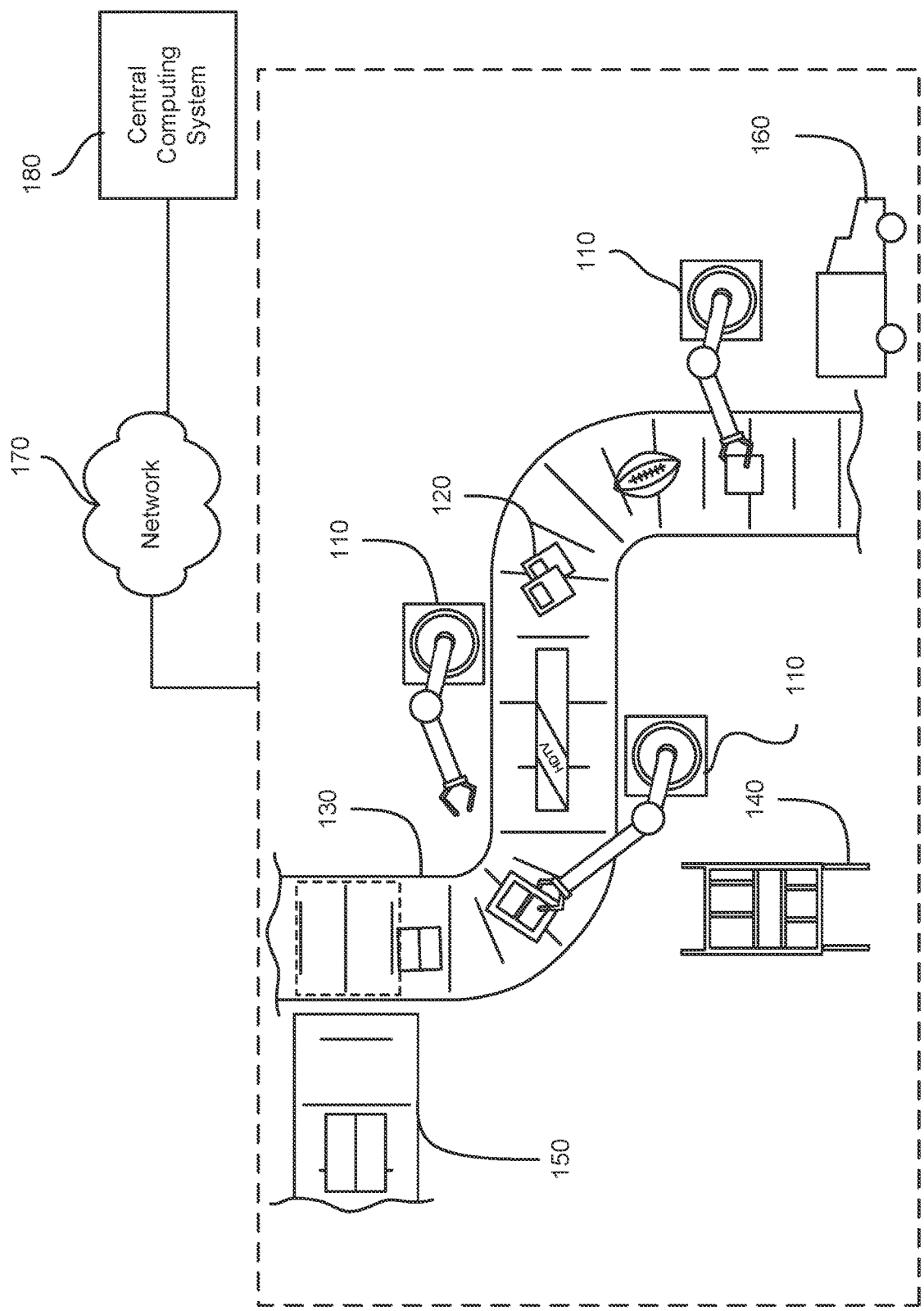
FIG. 1 illustrates an example of an inventory system including robot stations and a central station, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, training a machine-learning model using one or more semi-supervised training techniques. The semi-supervised training techniques can involve training the machine-learning model using any suitable combination of labeled data, pseudo-labeled data, and unlabeled data. In an example, a first machine-learning model can be trained using labeled data from an image (e.g., gathered by a robotic arm with respect to a set of objects, such as item packages). The label indicates mask associated with an object shown in the image (e.g., an item package). Upon the completion of the training using labeled data, a first image can be input to the first machine learning model in order to determine a first mask of an object shown in the first image. The first image can be transformed, using a transformation operation (e.g., a rotation) to generate a second image. The second image is also input to the first machine learning model in order to determine a second mask of the object. An inverse transformation is applied to determine, based on the second mask, a third mask of the object. Based on the first mask and the third mask, a pseudo-label is generated indicating a predicted mask of the object from the first, unlabeled image. A second machine-learning model can be trained at least by using the first pseudo-label (and similarly other generated pseudo-labels). The second machine-learning model can additionally be trained, for example, using the labeled data. To further increase the training dataset used for the second machine-learning model, training images can be generated by combining and/or transforming images having labels and/or images having pseudo-labels. Once trained, the second machine-learning model can be used to indicate one or more masks corresponding to objects in images. Manipulation of such objects can be controlled based on the masks.

To illustrate, consider an example involving robotic arm manipulation of packages in a fulfillment warehouse. A robotic manipulator can include or interface with a camera that can detect a set of packages, for example on a conveyor belt or other suitable surfaces, in a dense environment (e.g., many packages within a single image) based on an image. The robotic manipulator can include or otherwise apply at least one machine-learning model. This model can be trained as indicated above (e.g., it corresponds to the second machine-learning model) using images showing packages. An image output of the camera can be input to the machine-learning model that, in turn, outputs masks of detected packages. The robotic manipulator can manipulate (e.g., grasp, grab, pick, rotate, move, transport, and the like) the packages based on the masks.

In the above example, the machine learning-model can be implemented as an instance segmentation model. Instance segmentation models can be used in robotic manipulation of items because such models can allow detecting and delineating between items of interest in crowded dense scenes. In some examples, packages or other items may be robotically picked one at a time without any pre-specified order. Machine-learning models, such as a Mask Region-based Convolutional Neural Network (R-CNN) or other related models, can be used for instance segmentation. However, to develop robotic applications with adequate picking accuracy (e.g., exceeding 99%), different parameters need to be observed. For example, in a target rich environment with multiple items that can be picked in any order, it may be desirable to select items with higher segmentation quality. Additionally, it may be desirable to suppress occluded items due to associated picking difficulty. Further, high-quality training data time may not be available, or may be expensive or time-consuming to generate.

Unless properly trained, a Mask R-CNN may result in poor masks for some packages. Further, for scenarios such as a small package on top of a large package, a Non-Maximum-Suppression (NMS) stage of the conventional model may frequently pick the occluded large package while suppressing the small one. Whereas for successful robotic picking, the opposite behavior may be desired. The Mask R-CNN additionally shows weakness in correctly segmenting a package on top of another package. For example, a bounding box may be loose and may fit the larger package underneath the small one, and an associated confidence score may still be high or otherwise in an acceptable range, which is inconsistent with the apparent poor mask quality. Unoccluded packages in similar scenes may be segmented well by Mask R-CNN, which may result in inconsistent results. A carefully designed post-processing step for suppressing duplicate detections to avoid filtering out desired segments may be useful. Additionally, a reflection of the confidence of segmentation in the model's final output score may be useful.

Embodiments of the present disclosure provide several technical advantages based on a mask scoring technique and a training strategy. When the machine-learning is implemented as a segmentation model, such a model uses a mask quality score rather than merely a classification score (e.g., as in the case of a Mask R-CNN). For example, the mask quality score can be added to a Mask R-CNN model to yield a computer vision model, referred to herein as a MasQ R-CNN model. Additionally, a score associated with an NMS stage of the model can be added. As far as the training strategy, strong, or heavy, augmentations and semi-supervised training can be performed by (or otherwise with respect to) the MasQ R-CNN model, which can leverage the mask quality score. The training can involve using labeled data, unlabeled data, and pseudo-labeled data. Models trained using the semi-supervised learning technique can be characterized by improved performance over models trained using conventional training techniques. In addition to a net mean average precision (mAP) improvement (over the conventional models) of more than 6%, the resulting MasQ R-CNN models can achieve, in an in-production robotic system, a single package picking success rate of at least 99.5%.

A mask quality score can be defined and can be determined by the MasQ R-CNN. The mask quality score can identify good segments (e.g., segments that accurately represent an object), and the mask quality score can be used to improve the NMS stage of the MasQ R-CNN. The mask quality score can be used in active learning, in semi-supervised learning, in other suitable machine-learning techniques, or in any combination thereof. Semi-supervised learning can be adapted for instance segmentation. In particular, a machine-learning model (or other suitable neural network) can be trained using labeled data, then can use the labeled data to pseudo-label unlabeled images, can filter out pseudo-labels with low mask quality score or low consistency over weak augmentations such as rotations, and can use the filtered pseudo-labels for model training.

Turning to FIG. 1, the figure illustrates an example inventory system configured to implement the above described techniques. In particular, the example inventory system may include multiple robot stations 110 in communication with a central computing system 180 over a network 170. The central computing system 180 may collect, from the robot stations 110, data about how items 120 may be manipulated and may generate a collective knowledge about manipulations and propagate that knowledge to the robot stations 110. Each one of the robot stations 110 may use a computer vision model, trained using a semi-supervised learning technique, to manipulate objects. Images generated by the robot stations 110 (e.g., by cameras included therein) can be sent to the central computing system 180. This system 180 and/or another system interfacing therewith can use such images for generating training images.

Although FIG. 1 illustrates three robot stations 110, a smaller or larger number of robot stations (e.g., in the hundreds) may exist within the inventory management system. Some of the robot stations 110 may be stationary at specific locations. Yet some other of robot stations 110 may be mobile and may move between locations. The robot stations 110 may be configured to perform different tasks related to inventorying the items 120. These tasks may include manipulating the items 120. To manipulate an item, a robot station may include an appropriate robotic manipulator, such as one including a robotic arm and/or an end effector for the desired manipulation. A manipulation of an item may represent a set of actions applied to the item in association with an inventory task. For example, an item may be received from a source 150 external to the inventory system, such as from a manufacturing facility or a distribution facility. The item may arrive to the inventory system and may be delivered to a robot station by way of a conveyor belt 130, or some other delivery mechanism. The robot station may stow the item by, for example, grasping, moving, and releasing the item into a container. The container may be located in an inventory holder 140.

Additionally or alternatively, the robot station or another robot station may grasp and move the container to the inventory holder 140. The robot station may additionally interact with a human. For example, the robot station may receive an item from a human, hand over an item to a human, or perform other robot-human interactions. Grasping, moving, and releasing the item may represent examples of manipulations applied to the item. Similarly, grasping and moving the container may represent examples of manipulations applied to the container. Conversely, the same or a different robot station may stow the item from inventory holder 140 in preparation for a delivery of the item to a destination. The respective robot station may pick the container, grasp and move the item from the container, package the item, and place the package on the conveyor belt 130. Picking, packaging, and placing may represent other examples of manipulations. Once on the conveyor belt 130 again, the package may be moved to a delivery vehicle 160.

Some or all of the tasks of the robot stations 110 may be managed by the central computing system 180. In an example, the central computing system 180 may represent a computer system configured to provide different inventory management functionalities. The computing system may include a physical computing resource, such as a computer server. Additionally or alternatively, the computer system may include a virtual computing resource (e.g., a computing cloud-based resource). In an example, the computer system may include or otherwise train a machine-learning model, may deploy instances of the machine-learning model to the robot stations 110, and/or may receive images from the robot stations 110 to process them through the machine-learning model and send respond with instructions to the robot stations related to segmenting, classifying, and/or manipulation objects (e.g., packages on the conveyor belt 130).

Although FIG. 1 illustrates the central computing system 180 as a component separate from the robot stations 110, the central computing system 180 or functionalities thereof, may be integrated with a set of robot stations 110 or distributed among the robot stations 110. Further, and although FIG. 1 illustrates that the central computing system 180 supports a single inventory system, the central computing system 180 may support a larger number of inventory systems. Conversely, a single inventory system may subscribe to and be supported from multiple central stations.

The central computing system 180 may be in communication with CPUs of the robot stations 110. Generally, a CPU of a robot station can execute code for a computer vision model (e.g., a MasQ R-CNN) to detect items (e.g., packages on the conveyor belt 130) and determine how such objects are to be manipulated. The CPU can also host a controller to control an inventory action performed by the robot station on an item. The controller can additionally receive data (e.g., one or more images, etc.) generated by sensors or cameras of the robot station during the performance of the inventory action to control the item manipulations. The sensor data may include raw data that are measurements of one or more manipulation parameters (e.g., type and amount of force, pressure, voltage, and/or current applied, orientation of an item, etc.). Additionally, the sensor data can include a raw or processed image of one or more items, for example, on the conveyor belt 130.

The network 170 may include a public data network (e.g., the Internet) or a private data network (e.g., an intranet or a virtual private network (VPN)), wireless or wired, and implementing different communication protocols (e.g., TCP/IP). In an example, the network 170 may not only connect the central computing system 180 and the robot stations 110, but may also interconnect the robot stations 110 themselves. As such, the robot stations 110 may be able to exchange sensor data and classifiers among themselves. This may be the case when, for instance, functionalities of the central computing system 180 may be distributed between some or all of the robot stations 110. Hence, the robot stations 110 and the central computing system 180 may be networked by way of the network 170. Knowledge about event classifications, instance segmentations, images of items, training machine-learning models, and the like may be generated, propagated, and updated over time. As such, a robot station may exploit knowledge generated based on sensor or image data of other robot stations.

The robot stations 110 of FIG. 1 may be examples of a robotic system. Generally, a robotic system may be a system that includes a set of robots and a set of controllers that control the robot set. The robotic system may be used to perform an action on an item (e.g., a physical object), where the performance may include manipulating the item. The action can be an inventory actions to manipulate the item for inventorying purposes (in, out, and/or through a facility).

Figure 2:
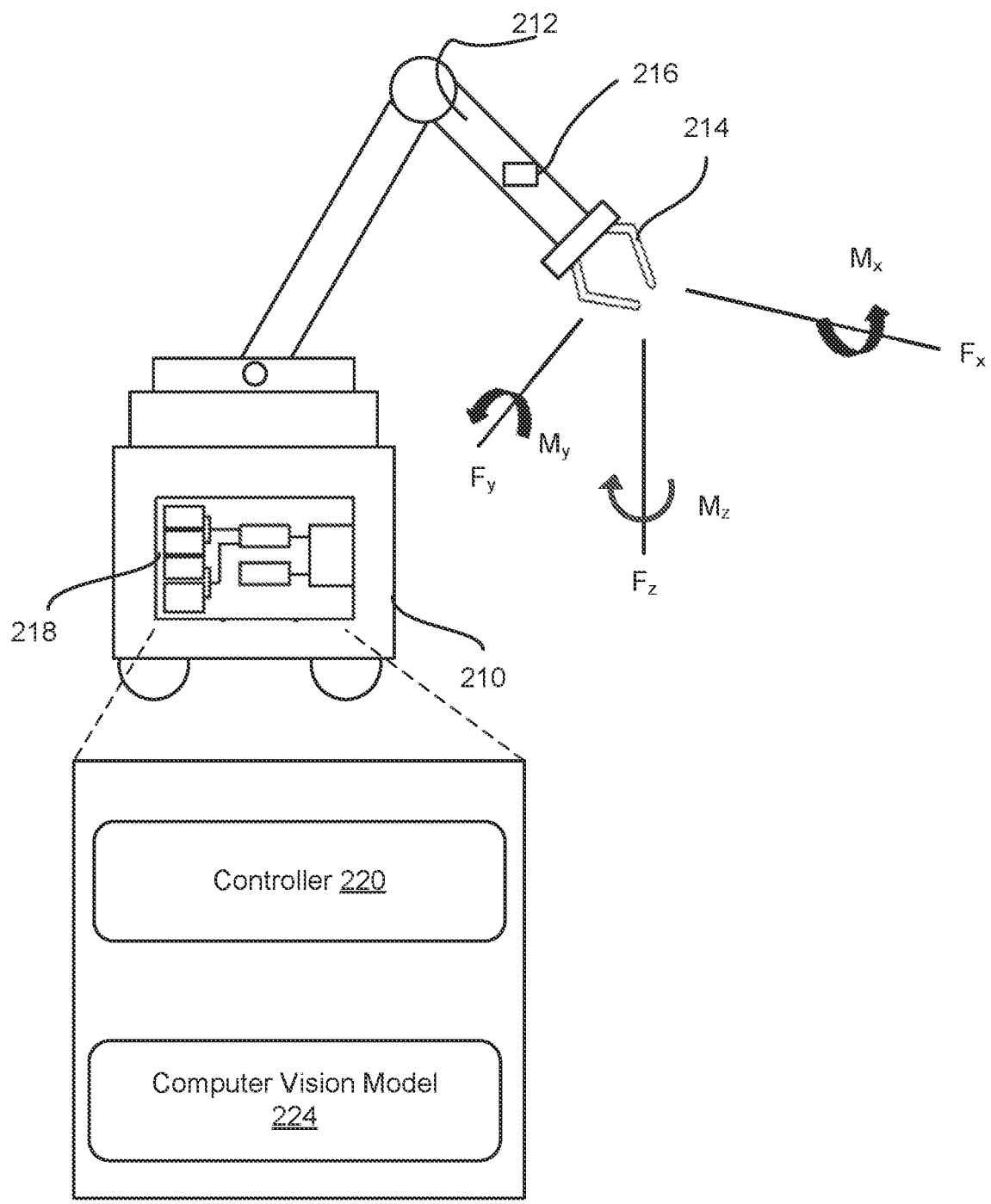
FIG. 2 illustrates example components of a robot station and a central station, according to a particular embodiment.

FIG. 2 further illustrates components of a robot station 210 as an example of a robotic system. Similar to the robot stations 110 of FIG. 1, the robot station 210 may be in communication with a central computing system, such as the central computing system 180 in FIG. 1, over a network.

The robot station 210 may include a robotic arm 212 and an end effector 214. Although the description herein primarily refers to a robotic arm 212, any other mechatronic or robotic device may be used in lieu of or in addition to a robotic arm. The end effector 214 may be connected to an end of the robotic arm 212 and configured to manipulate an item. Any suitable end effector (or number or combination of end effectors) may be utilized, including, but not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or Ferro fluids (e.g., fluids having suspended Ferromagnetic particles capable of altering a size or shape of the fluid volume when subjected to a magnetic field). Vacuum end effectors may manipulate items using suction. Electroadhesion end effectors can include an array of electrodes arranged along a flexible or rigid substrate capable of applying a charge (akin to static electricity) that can adhere an item to the substrate portions that are in contact with the item. Mechanical or electromechanical end effectors may include pinchers, claws, grippers, or other rigid components that may be actuated relative to one another for manipulating an item. Other end effectors may also be utilized to facilitate additional manipulation techniques, such as trays, scoops or other similar structures. For example, a magnetic or electromagnetic end effector may be useful for manipulating items having Ferro-magnetic materials.

In an example, the robot station 210 may also include a camera 216 or other suitable type of sensor (e.g., a set of optical sensors) configurable to generate an image. While one camera 216 is illustrated, more than one camera 216 can be used to generate the image. The camera 216 may be installed at different points of the robot station 210 including, for instance, at the robotic arm 212, the end effector 214, or between the robotic arm 212 and the end effector 214. The camera 216 can be positioned at any joint of the robotic arm 212 or in any other suitable location with respect to the robot station 210. Images generated by the camera may be further processed to determine masks with respect to items. Such masks can be used to perform a manipulation with respect to the item.

Any suitable optical sensor or imaging device can be used as the camera 216. For example, the imaging devices or the optical sensors may be used to determine physical characteristics, such as size, shape, position, orientation, and/or surface characteristics (e.g., how porous and/or slippery the item is based on the surface appearance). Any suitable optical technology can be utilized, including, but not limited to, two-dimensional cameras, depth sensors, time of flight sensing (e.g., broadcasting a source of light and determining a time of reflection for each pixel to determine a distance from the sensor for each pixel to determine a three-dimensional array of data points representing a virtual model of the sensed item and environment), structured light sensing (e.g., projecting a known image from a light source, observing the image as distorted by variations in the surface of the detected item, and analyzing the distortions with respect to the projected image to determine positioning of the features that caused the distortion), stereo sensing (e.g., analyzing differences in images collected from multiple cameras arranged at known offsets from one another to generate a point cloud or digital model), active stereo sensing (e.g., projecting a pattern of light to improve precision of detection of features while using stereo sensing), any other optically-based methodology of observing light for generating a digital representation of a physical object, or any combination thereof.

The computer system 218 may host or otherwise include a controller 220. The controller 220 may be configured to specify an inventory action (e.g., pick, place, stow, rotate, etc.) or to perform other suitable operations for controlling a robotic manipulator (e.g., the end effector 214). For example, the controller 220 can specify an operation of the end effector 214 configured to manipulate the item, or an operation of a robotic arm 212 configured to move the end effector 214. The specified operation may be based on manipulation capabilities (e.g., what robotic arms and end effectors are installed at the robot station 210), usages of the robot station 210 (e.g., what tasks the robot station 210 may perform), and/or the items that the robot station 210 may manipulate.

In an example, the computer system 218 also includes a computer vision algorithm 224 (code stored in memory and executable by a processor of the computer system 218). The computer vision algorithm 224 may be a model trained (e.g., via one or more semi-supervised learning techniques) for detecting packages and for causing a robotic manipulation with respect to the detected packages. In some examples, the computer vision algorithm 224 can detect a package and can transmit an output to the controller 220 for controlling the robot station 210 or for other purposes. For instance, the computer vision algorithm 224 can receive optical data (e.g., an image including one or more packages) generated by the camera 216 and can output masks for the one or more packages. For example, the computer vision algorithm 224 can generate a mask that indicates a package and can transmit information about the mask to the controller 220 for causing a robotic manipulation to be performed with respect to the package.

In an example, the controller 220 receives the output from the computer vision algorithm 224 and performs the robotic manipulation. In some examples, the controller 220 can verify the mask and can perform the robotic manipulation. The controller 220 may transmit the output to a central computing system (e.g., central computing system 180 in FIG. 1) configured to update and fine-tune aspects of the robotic station 210 over time. For example, the central computing system 180 may receive outputs from multiple robotic stations and fine-tune (e.g., re-train or continuously train the computer vision model 224) the robotic stations based on the outputs.

In an example, the robot station 210, or any component thereof such as the computer system 218 or the computer vision algorithm 224, can implemented a MasQ R-CNN. For example, the robot station 210 can apply the MasQ R-CNN for generating masks of packages.

Figure 3:
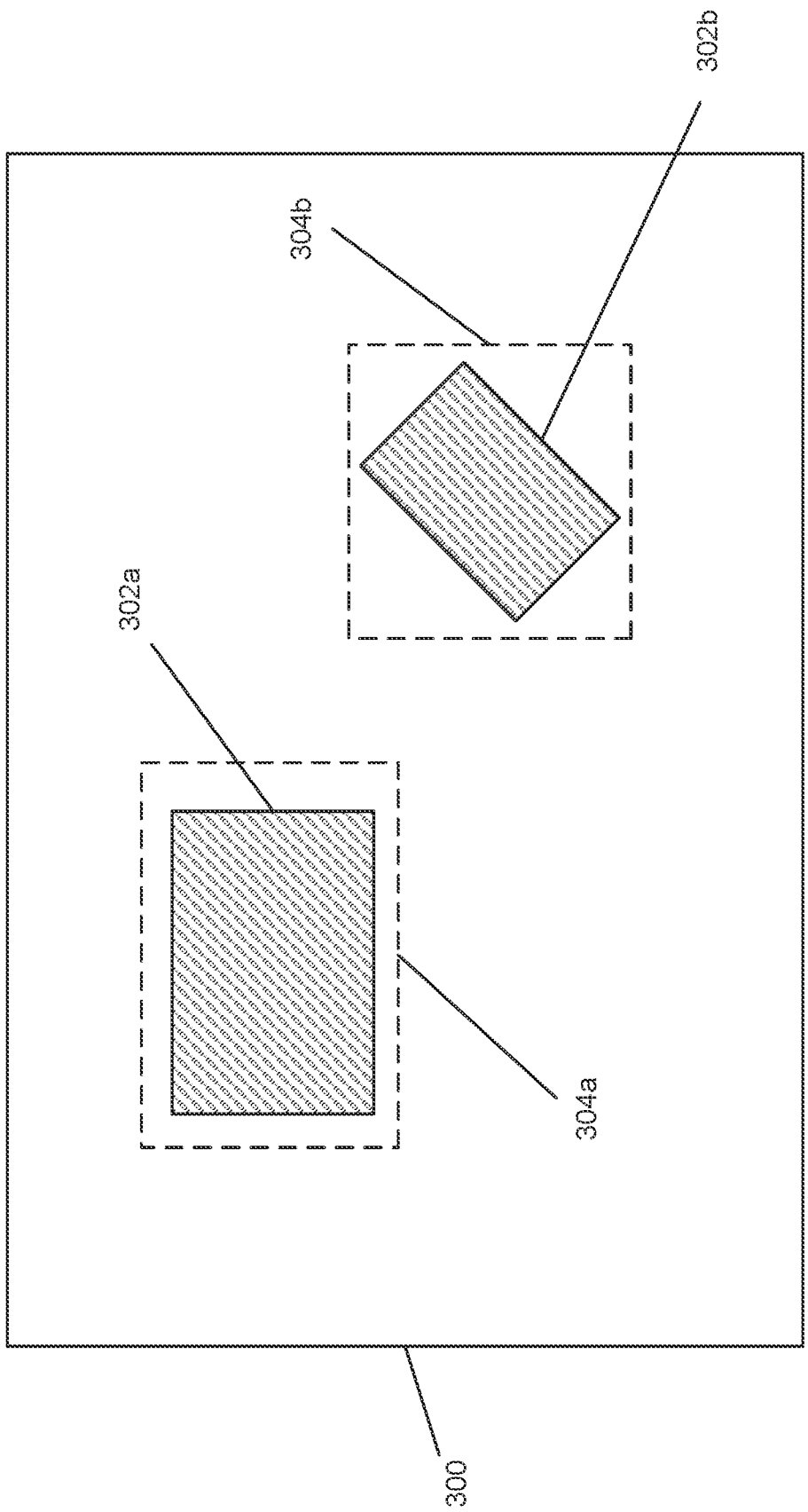
FIG. 3 illustrates an example of an image, having various labels, from a camera of a robot station.

FIG. 3 illustrates an example of an image 300, having various labels 302a-b and 304a-b, from a camera 216 of a robot station 210. In an example, the image 300 can be a labeled image that can be used to train a first machine-learning model (e.g., a teacher model) and/or a second machine-learning model (e.g., a student model). In another example, the image 300 is generated after training and input to a trained machine-learning model (e.g., the student model implemented as a computer visional model), and the output of this model can indicate the labels 302a-b and/or 304a-b.

Generally, a label 304 may correspond to a classification by indicating that a region in the image (e.g., a bounding box) where an object is detected and that this object has a particular classification (e.g., is classified an item package). As illustrated in FIG. 3, the label 304 can be represented by a bounding box that includes the region. In an example, all bounding boxes are aligned along X-Y axes of the image (shown in FIG. 3 as two horizontal rectangles). In another example, a bounding box need not be aligned with the X-Y axes and, instead, may be oriented depending on how the object is detected in the image. In comparison, a label 302 may indicate a segmentation of the object by indicating a mask within the bounding box where the object is found (e.g., specific pixel locations corresponding to the edges and remaining portions of the object as shown in the image 300). In an example, the label 302 can be represented by a bounding box that includes the specific pixels and is generally oriented depending on these pixels. A label 302 and/or a label 304 are generated per surface of the object, where the surface is detected in the image. As such, if for instance, two surfaces are detected for an object, two bounding boxes for the classification and/or two masks for the segmentation may be generated.

As indicated above, the image 300 can be a training image used for training one or more machine-learning models. For example, the image 300 can be used to train a first machine-learning model (e.g., a teacher model). In this example, the labels 302a-b and/or 304a-b can be annotated based on user input. In other examples, the image 300 can be unlabeled and can be used to generate pseudo-labels (e.g., labels 302a-b and/or 304a-b are pseudo-labels).

As also indicated above, the image 300 can be generated after the machine-learning model(s) is(are) trained and used to actually control robotic manipulations. In this case, the labels 302a-b and the labels 304a-b can be generated by the same or different ones of the trained machine-learning models.

Figure 4:
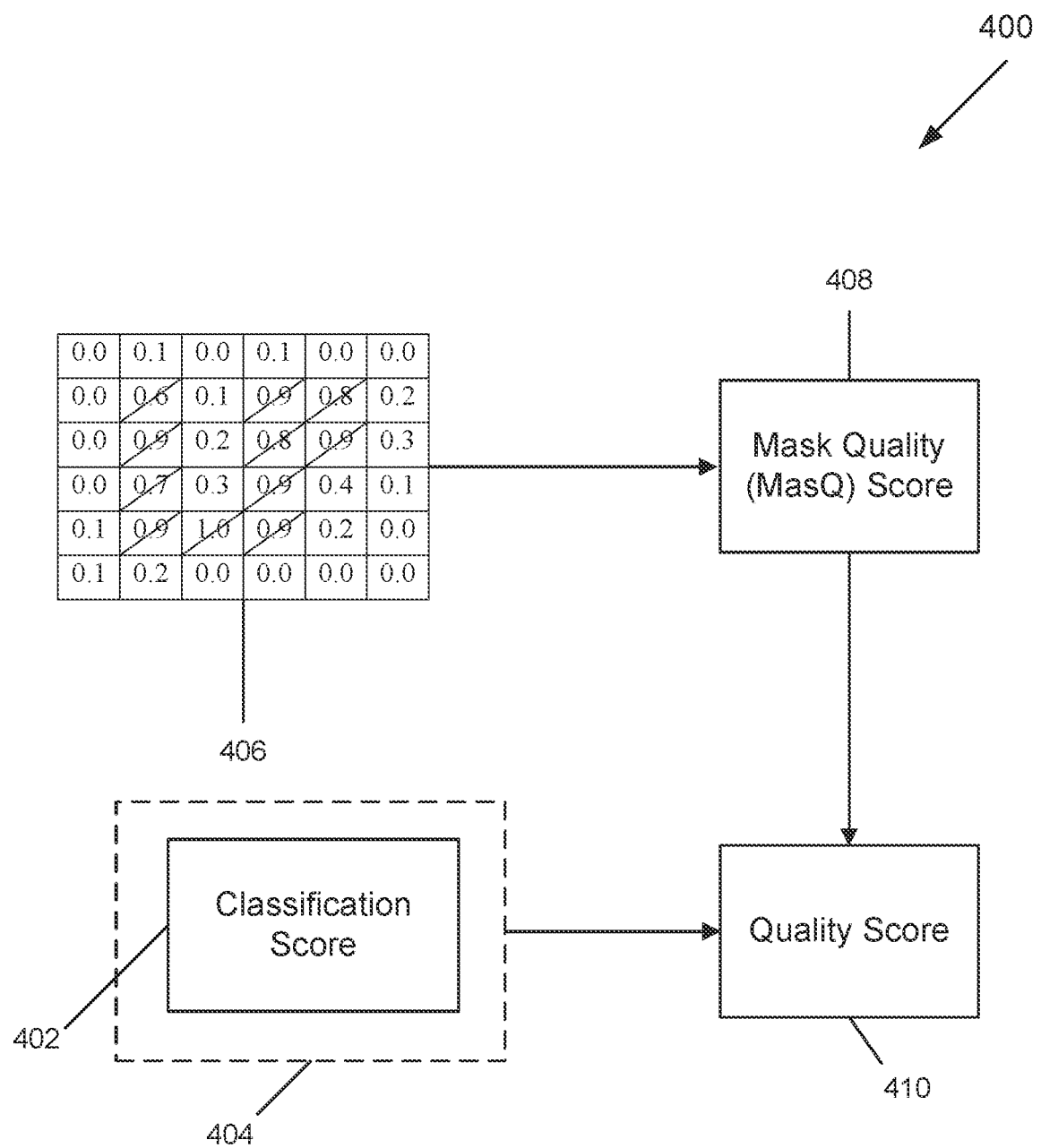
FIG. 4 illustrates an example of a flow that can be performed by a computer vision model.

FIG. 4 illustrates an example of a flow 400 that can be performed by a computer system (e.g., the computer system 218) implementing a computer vision model (e.g., a MasQ R-CNN model). The flow 400 can be performed with respect to an object (e.g., a package or the like) in a high-density environment (e.g., a fulfillment center or the like). In an example, the flow 400 can be used to apply a mask to an object for causing a robotic manipulation or for other suitable purposes. While illustrated in a certain order, operations described with respect to the flow 400 can be performed in any suitable order.

In an example, the flow 400 includes determining, for example by the computer system, a classification score 402 with respect to an object 404. The computer system may receive an input image (e.g., from the camera 216) that can include a depiction of the object 404. The classification score 402 can be generated by the computer vision model with respect to each object 404 included in the image. The classification score 402 can indicate a type of the object 404 or other suitable information. For example, the computer vision model can classify the object 404 as a package, as not a package, or other suitable classifications. The classification score 402 can include a confidence score associated with the classification.

In an example, the flow 400 includes determining, by the computer system, pixel-level confidence scores 406. In particular, the computer vision model performs one or more segmentation operations with respect to the image, for example, if there is at least one object 404 included in the image that has been classified to have a particular classification (e.g., as being a package). The segmentation can indicate a mask at a pixel level, where each pixel can have a segmentation confidence score. A segmentation confidence score of a pixel exceeding threshold (e.g., 0.5) indicates that the pixel belongs to the mask; otherwise, the pixel does not belong to the mask. As such, the pixel-level confidence scores 406 can be generated and indicate how likely the object 404 is depicted at these pixels.

In an example, the flow 400 includes determining, by the computer system, a mask quality score 408. The computer system can use the pixel-level confidence scores 406 to determine the mask quality score 408. For example, the computer vision model can apply a threshold to the pixel-level confidence scores 406 for filtering low-confidence scores that correspond to pixels not belonging to a mask, and retaining high-confidence scores that correspond to pixels defining the mask, (e.g., shown in FIG. 4 with the diagonally marked boxes having confidences scores over a 0.5 threshold). Once the mask is defined, an averaging operation (or some other set of statistical operations as further described herein below) is performed on the retained high-level confidence scores 406 to determine the mask quality score 408. The mask quality score 408 may indicate a quality level associated with a proposed or estimated mask spanning the corresponding pixels.

In an example, the flow 400 includes determining, by the computer system, a quality score 410. The computer vision model can determine the quality score 410 based on the classification score 402 and the mask quality score 408. As such, the quality score 410 may be referred to herein also as combination score. When a mask Q-CNN is used and includes a non-maximum suppression (NMS) layer, the quality score 410 may also be referred to as an NMS score. In an example, the quality score 410 is computed by multiplying the mask quality score 408 by the classification score 402. The quality score 410 and similarly other computer mask scores computed based on the image can be used to filter mask candidates for selecting an optimal mask to apply to the object 404.

The MasQ R-CNN model can modify an NMS stage of a conventional Mask R-CNN to utilize a mask quality score during inference. By making the modification, confident masks can be retained through and after suppression. Accordingly, per-pixel confidence scores of mask prediction can be used to approximate a predicted or otherwise determined quality of a mask. An average of the pixel-level confidence scores, h(x), that may exceed a predefined threshold value for binarizing the predicted mask, (e.g., 0.5 or other suitable thresholds) can be determined. To match a range of the classification score 402, the average score is scaled to (0; 1]:

$$score_{masq} = 2 * \left( \frac{1}{|I_{h(x)>0.5}|} \sum_{x:h(x)>0.5} h(x) - 0.5 \right)$$

where I is an indicator function. The mask quality score (score masq) can be multiplied by the classification confidence score 402, for example, for determining the quality score 410.

The MasQ R-CNN may leverage (e.g., directly or otherwise) the pixel-level confidence scores 406 for the mask head for intrinsic information related to the difficulty of segmentation. An intersection-over-union (IoU) threshold value can be determined for an object detection stage quality score determination as 0.95 (or other suitable threshold value) to filter out overly redundant mask candidates with classification scores 402. The mask head of the MasQ R-CNN can predict a binary mask per region-of-interest to generate multiple outputs, which can be filtered by the main NMS with the mask quality score 408, the quality score 410, the classification score 402, or any suitable combination thereof.

Figure 5:
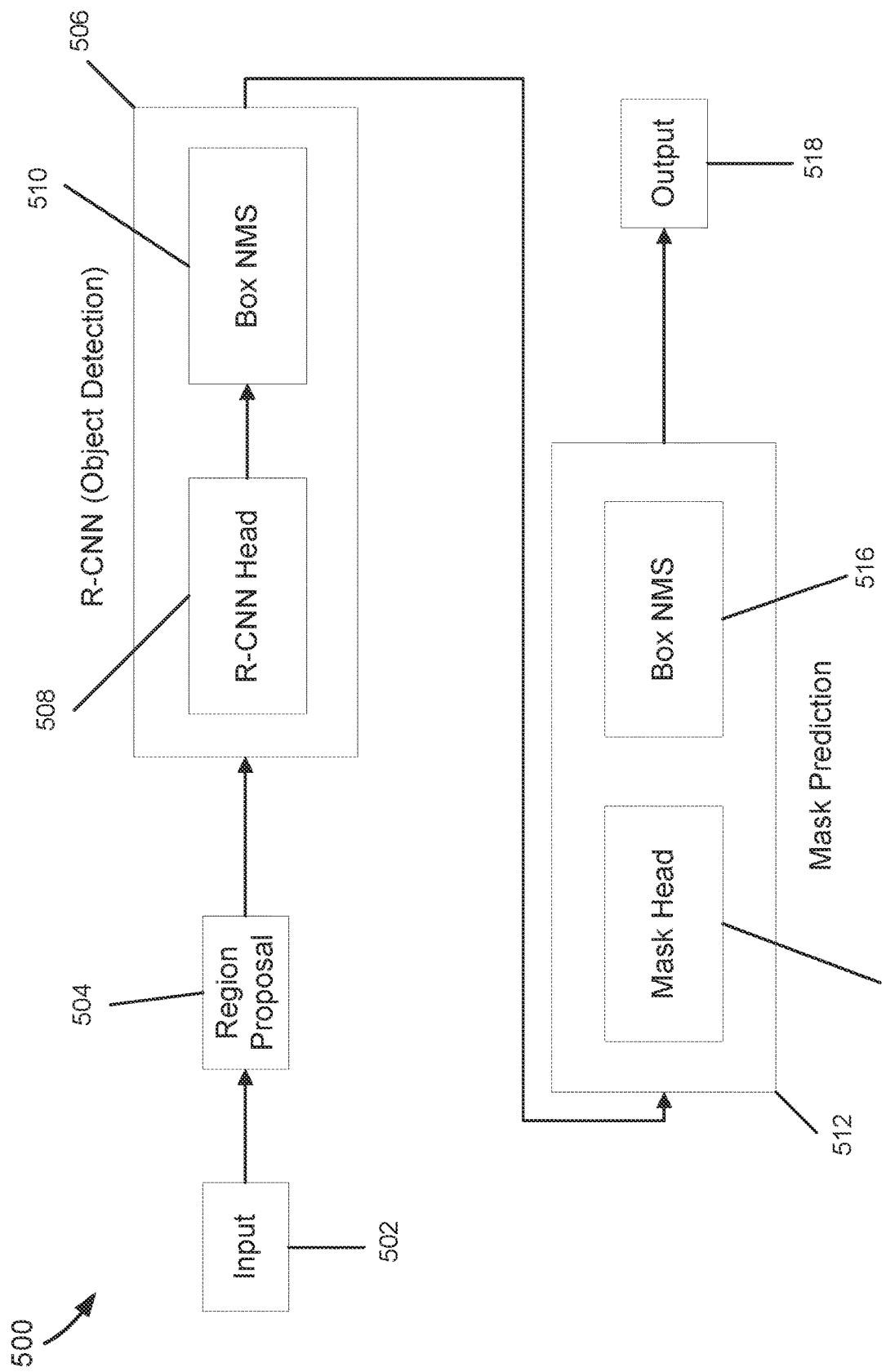
FIG. 5 illustrates an example of a flow for determining mask predictions of an image.

FIG. 5 illustrates an example of a flow 500 for determining mask predictions of an image. The flow 500 can be performed, for example, by a computer system (e.g., the computer system 218) implementing a computer vision model (e.g., a MasQ R-CNN) for predicting or otherwise determining masks for one or more objects (e.g., the object 404). While illustrated and described in a certain order, operations of the flow 500 may be performed (and information determined) in any suitable order.

In an example, the flow 500 includes an input 502. The input 502 can include an image (e.g., the image 300 or other suitable image or set of images) or other suitable input for determining masks associated with the input 502. Based on the input 502, a region proposal 504 can be generated by the computer vision model. The region proposal 504 can include potential areas within the input 502 that may include an object for performing a robotic manipulation. For example, the region proposal 504 can include a set of pixels (e.g., via a bounding box) that may include the object, additional content from the image, or a combination thereof.

In an example, the input 502, the region proposal 504, or a combination thereof can be input into an object detection module 506. The object detection module 506 can be an R-CNN or other suitable module or model for detecting, for classifying, or for performing other suitable tasks with respect to an object. The object detection module 506 can include an R-CNN head 508, a box NMS 510, and/or other suitable components or sub-modules.

The input 502, the region proposal 504, or a combination thereof can be received, via the object detection module 506, at the R-CNN head 508. The R-CNN head 508 can perform a bounding box regression, can perform a classification operation, and can perform other suitable tasks. For example, the R-CNN head 508 can determine a bounding box with respect to the object and can classify the bounding box (or the object within the bounding box). A classification score (e.g., the classification score 402) can be generated by the R-CNN head 508 and can be transmitted to the box NMS 510 of the object detection module 506. The box NMS 510 can apply an IoU threshold to the classification score. In an example, the R-CNN head 508 can determine a set of classification scores for one or more objects, and the box NMS 510 can apply the IoU threshold to the set of classification scores for filtering out redundant or non-confident classification scores or for other purposes. The filtered classification scores can be used to determine the regions, bounding boxes, or other suitable data to transmit to a mask prediction module 512.

The mask prediction module 512 can include a mask head 514, a box NMS 516, and other suitable components. The regions, bounding boxes, or other suitable data associated with the filtered classification scores can be received by the mask prediction module 512 at the mask head 514. The mask head 514 can perform a binary mask prediction and other suitable tasks with respect to the received data. For example, the mask head 514 can determine whether each pixel included, for example, in a bounding box associated with an object shows a portion of the object (belongs to the mask) or does not show the object (does not belong to the mask). The binary mask prediction operation can involve other suitable tasks such as determining a mask quality score. The mask head 514 can transmit the results of the binary mask prediction to the box NMS 516 for scoring and thresholding. For example, the box NMS 516 can determine, for a bounding box, a quality score based on the classification score and the mask quality score associated with the bounding box. The box NMS 516 can apply a second IoU threshold (e.g., 0.5 or other suitable threshold value) to the quality score or to other suitable scores associated with the bounding box. The mask prediction module 512 can subsequently provide an output 518. The output 518 can include one or more masks associated with the input 502 image. For example, the output 518 can include a predicted mask, which may be a highest-quality mask or mask that most closely indicates the object, for each detected object in the input 502. The output 518 can include other suitable outputs generated by the mask prediction module 512.

Figure 6:
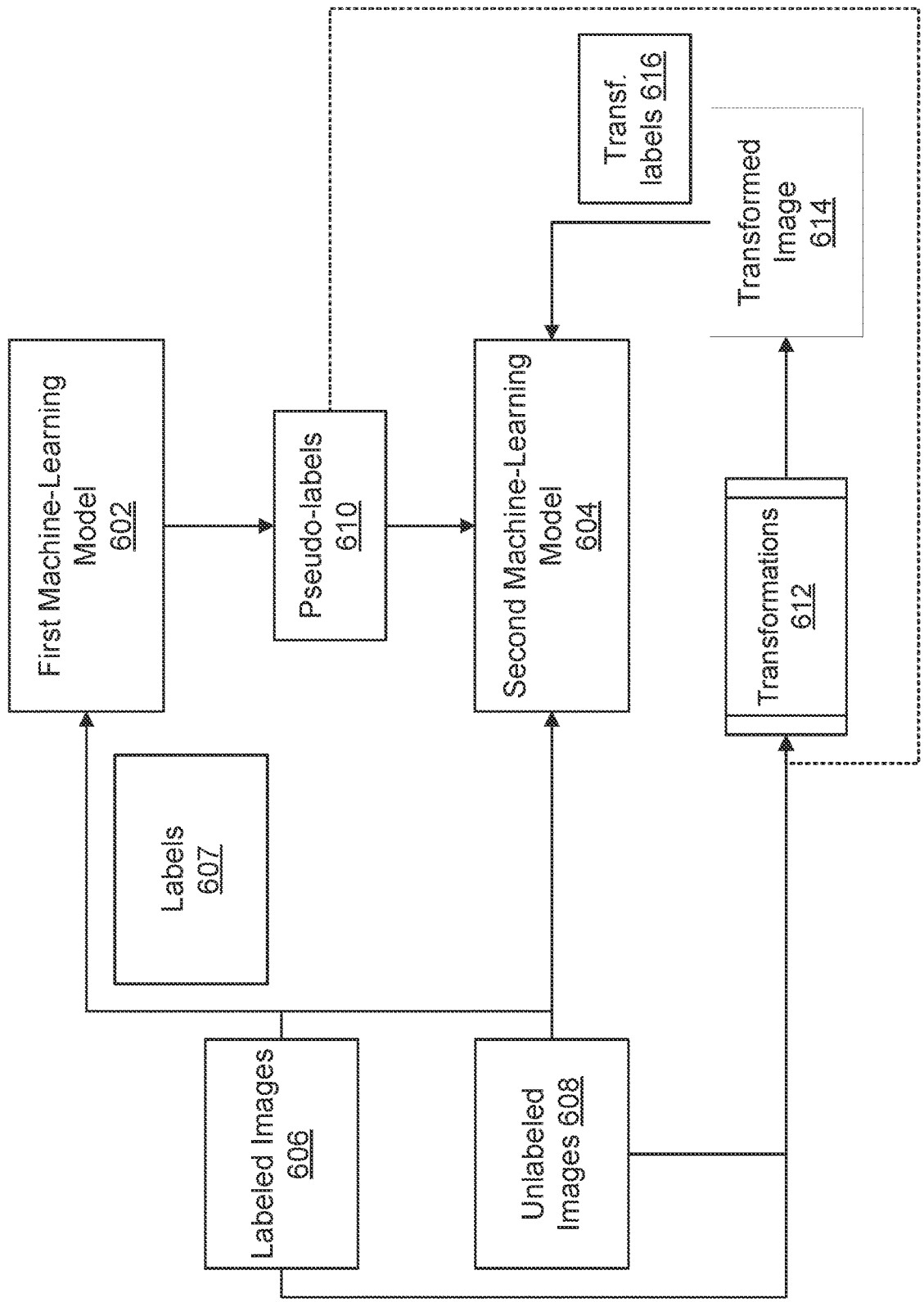
FIG. 6 illustrates an example of data flow for training a first machine-learning model and a second machine-learning model.

FIG. 6 illustrates an example of data flow for training a first machine-learning model 602 and a second machine-learning model 604. In an example, the first machine-learning model 602 is a teacher model, and the second machine-learning model 604 is a student model that can, at least partially, be trained by the teacher model. Each of these models can be implemented as a MasQ R-CNN model. The first machine-learning model 602 can be trained, in an example, using labeled images 606. The labeled images 606 can include images of objects for which labels 607 exist. Label corresponding to an object shown in an image can be defined based on user input (e.g., human annotation) and indicate a mask of the object. The labeled images 606 and labels 607 can additionally be input into the second machine-learning model 604 for training the second machine-learning model 604 (though other images or data may additionally or alternatively be used to perform this training).

After training the first machine-learning model 602 with the labeled images 606, unlabeled images 608 can be input into the first machine-learning model 602. The unlabeled images 608 can include images of objects that do not include labels or masks. The first machine-learning model 602 can, based on the unlabeled images 608, generate one or more pseudo-labels 610 that can correspond to the unlabeled images 608. The unlabeled images 608 can additionally be input into the second machine-learning model 604 for training the second machine-learning model 604.

In an example, a set of transformations 612 can be performed with respect to the labeled images 606, to the unlabeled images 608 (having pseudo-labels 610 associated therewith, as indicated with the dotted arrow), or to a combination thereof. The transformations 612 can involve distorting, rotating, flipping, augmenting (e.g., via light augmentation or heavy augmentation), combining images (e.g., via cut/paste operations, also referred to as cut/mix operations) or performing other suitable transformations with respect to the labeled images 606 or the unlabeled images 608. The transformations 612 can result in one or more transformed images 614. The same transformations can be performed to the corresponding labels of pseudo-labels (e.g., the corresponding masks), resulting in transformed labels 616. The transformed images 614 and the transformed labels 616 can be input into the second machine-learning model 604 as part of its training.

As such, the second machine-learning model 604 can be trained using various inputs. For example, the second machine-learning model 604 can receive the labeled images 606, the labels 607, the unlabeled images 608, the pseudo-labels 610, the transformed image 614, and the transformed labels 610. The second machine-learning model 604 can be trained using a semi-supervised learning technique in which the first machine-learning model 602, in which the second machine-learning model 604 is a student and the first machine-learning model 602 is a teacher.

Figure 7:
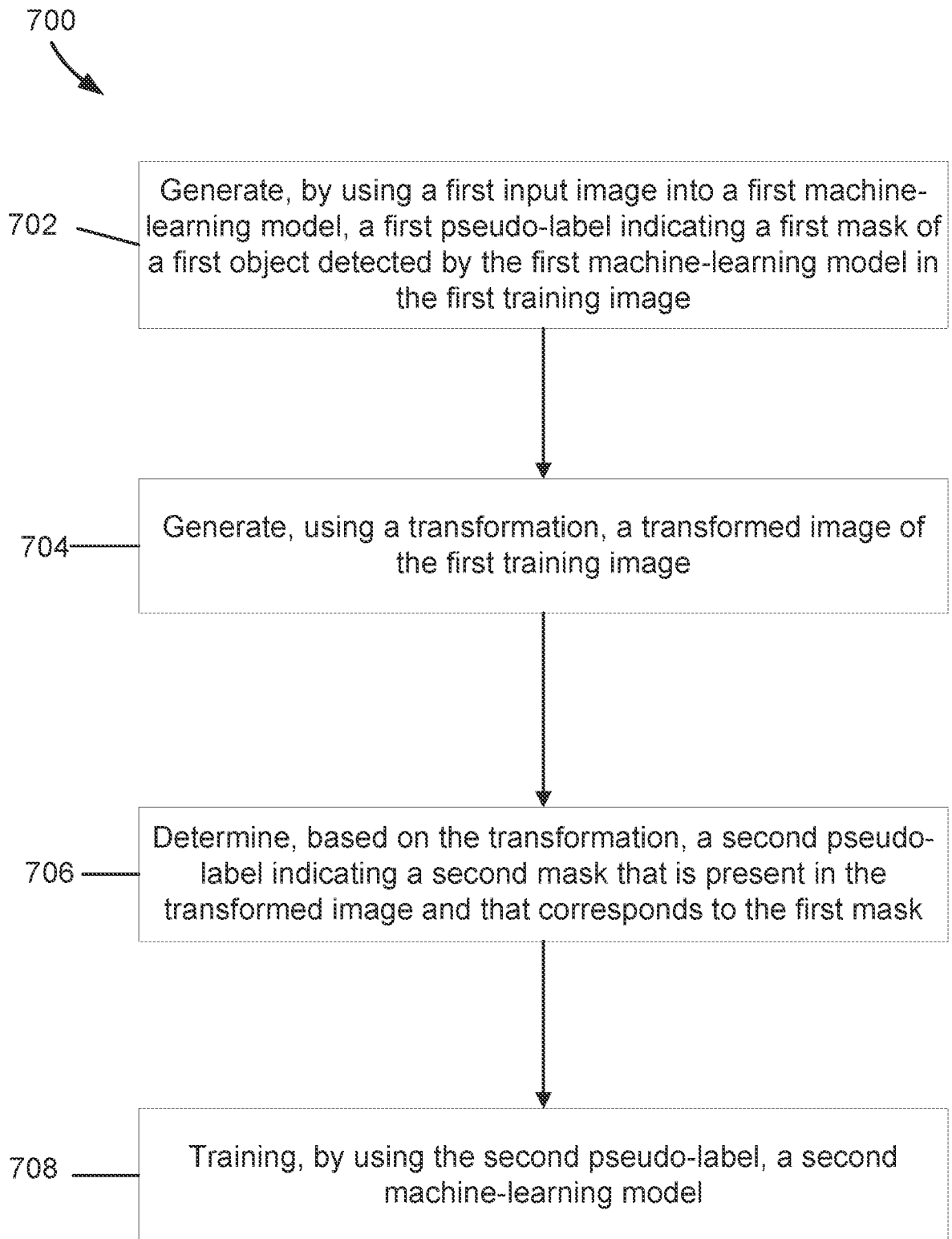
FIG. 7 illustrates an example of a flow for training a second machine-learning model using pseudo-labels from a first machine-learning model.

FIG. 7 illustrates an example of a flow 700 for training a second machine-learning model using pseudo-labels from a first machine-learning model. In an example, the flow 700 includes operation 702, where a computer system (e.g., the computer system 218) generates a first pseudo-label indicating a first mask of a first object detected by a first machine-learning model (e.g., the first machine-learning model 602) in a first training image. The first machine-learning model may be previously trained based on labeled data (e.g., from labeled images 606). The first machine-learning model can receive a first input that can include the first training image that shows the first object. In an example, the first training image may be unlabeled such that no masks or other suitable labels may be input into the first machine-learning model and correspond to the first object.

In an example, the flow 700 includes operation 704, where the computer system generates, using one or more transformations, a transformed image based on the first training image. The transformations can include distortion, translation, reflection, image combination, and/or any other suitable transformations. The transformed image can be transformed more than one time. For example, a first transformation can be applied to the first training image, and then the first transformation can be re-applied or a second transformation (e.g., an inverse transformation) can be applied.

In an example, the flow 700 includes operation 706, where the computer system determines, based on the transformation performed with respect to the operation 704, a second pseudo-label indicating a second mask that is present in the transformed image and that corresponds to the first mask. For example, the second mask may be a transformed (e.g., distorted, etc.) version of the first mask, where the one or more transformation applied in operation 704 are used to derive the second mask from the first mask.

In an example, the flow 700 includes operation 708, where the computer system trains, using the second pseudo-label, a second machine-learning model. For example, the computer system can generate a training data set that includes images. This dataset can include any available labeled images and their corresponding labels, the first training images and the first pseudo-label, the transformed image and the second pseudo-labels, and, similarly, other training/transformed imaged and their pseudo-labels. The training dataset can be input to the second machine learning model using a semi-supervised learning technique.

Figure 8:
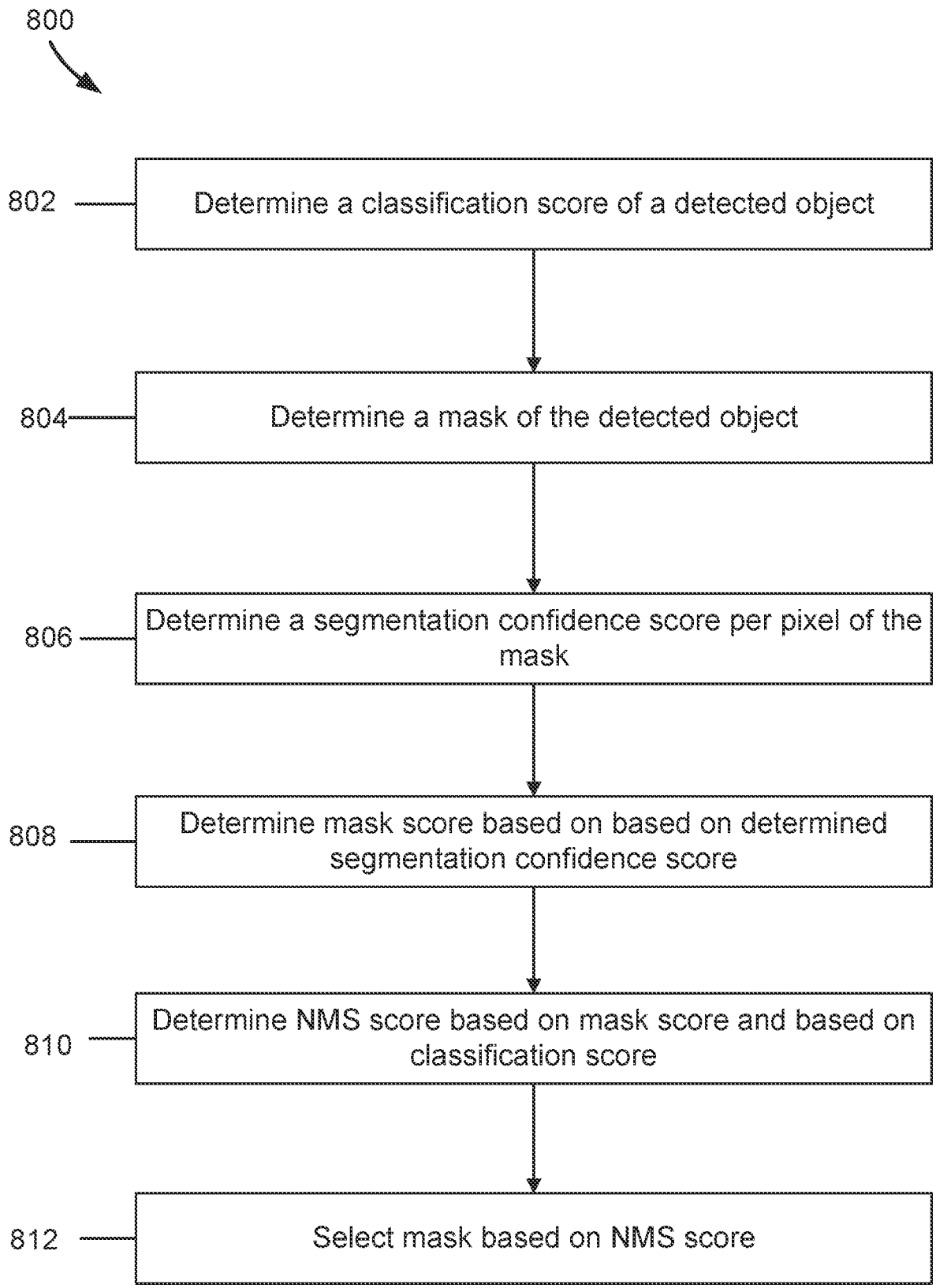
FIG. 8 illustrates an example of a flow for selecting a mask with respect to an image.

FIG. 8 illustrates an example of a flow 800 for selecting a mask with respect to an image. In an example, the flow 800 includes operation 802, where a computer system (e.g., the computer system 218) determines a classification score of a detected object. The classification score can be similar to the classification score 402 described with respect to FIG. 4. The computer system can detect an object from an image and can perform a classification operation with respect to the image and object. The classification operation can involve determining whether the detected object is a package (or other item-of-interest) or not a package.

In an example, the flow 800 includes operation 804, where the computer system determines a mask of the detected object. In an example, the mask can include a bounding box that may encompass the detected object, where this bounding box may be determined according to a segmentation technique. In other examples, the mask determined with respect to the operation 804 may be an estimated or otherwise proposed mask that may (or may not) properly encompass the detected object. Additionally, the determined mask may include more than one detected object.

In an example, the flow 800 includes operation 806, where the computer system determines a segmentation confidence score with respect to each pixel of the determined mask. In an example, the segmentation confidence score can be similar to the pixel-level confidence score 406 described with respect to FIG. 4. The segmentation confidence score can involve calculating a confidence value (e.g., from zero to one) for each pixel in the determined mask. The confidence value of a pixel can indicate whether the detected object is shown in the pixel. The segmentation confidence score can be determined using various techniques including those described with respect to FIG. 9 and FIG. 10.

In an example, the flow 800 includes operation 808, where the computer system determines a mask score (e.g., the mask quality score 408 described with respect to FIG. 4) based on the determined segmentation confidence score. In an example, the computer system can determine the mask score by filtering and averaging the segmentation confidence scores. The filtering operation can be performed by the computer system, for example, using a threshold. The mask score can indicate a quality (e.g., the accuracy) of the mask determined with respect to the operation 804.

In an example, the flow 800 includes operation 810, where the computer system determines a quality score based on the mask score and the classification score. The quality score determined with respect to the operation 810 may be similar to the quality score 410 described with respect to FIG. 4. In an example, the computer system can determine the quality score by multiplying the classification score (e.g., determined with respect to the operation 802) and the mask score (e.g., determined with respect to the operation 808).

In an example, the flow 800 includes operation 812, where the computer system selects a mask based on the quality score. In an example, the computer system can apply a predefined threshold to the quality score. In some examples, the computer system can select the mask based on a highest, or otherwise optimized, quality score. For example, the mask associated with the optimized quality score may be selected by the computer system.

Figure 9:
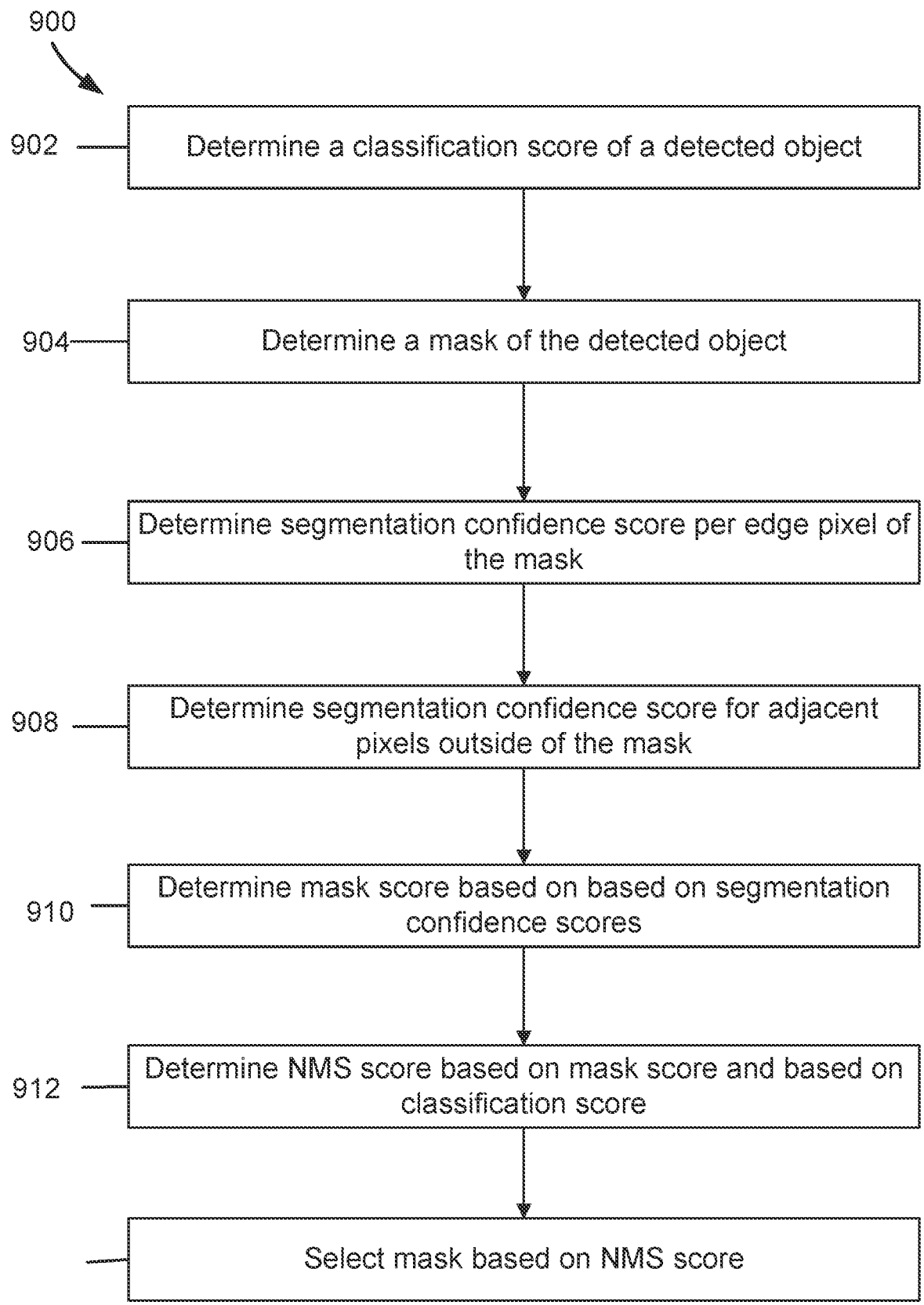
FIG. 9 illustrates an example of a flow for selecting a mask with respect to an image and using segmentation confidence scores of edge and adjacent pixels.

FIG. 9 illustrates an example of a flow 900 for selecting a mask with respect to an image and using segmentation scores of the image. In an example, the flow 900 includes operation 902, where a computer system (e.g., the computer system 218) determines a classification score of a detected object. This operation is similar to operation 802.

In an example, the flow 900 includes operation 904, where the computer system determines a mask of the detected object. This operation is similar to operation 804.

In an example, the flow 900 includes operation 906, where the computer system determines a segmentation confidence score per edge pixel of the mask. The mask, determined at the operation 904, may include a set of pixels. The set of pixels can include edge pixels, which may be located at one or more edges of the mask (e.g., the edge pixels may be adjacent to both pixels outside of the mask and pixels inside of the mask). The computer system can determine the segmentation confidence score (e.g., the pixel-level confidence scores 406 of FIG. 4) for each of the edge pixels. The segmentation confidence scores of the edge pixels may range from zero to one and may indicate how likely each edge pixel includes the detected object.

In an example, the flow 900 includes operation 908, where the computer system determines segmentation confidence scores for pixels adjacent to the edge pixels and outside of the determined mask. The computer system may identify the pixels outside of the mask by being adjacent to the edge pixels.

In an example, the flow 900 includes operation 910, where the computer system determines a mask score based on the segmentation confidence scores. In an example, the computer system can use the segmentation confidence scores of the edge pixels and the segmentation confidence scores of the adjacent outside pixels to determine the mask score. The computer system averages (or uses some other statistical function) the segmentation confidence scores of the edge pixels and of the adjacent outside pixels to determine the mask score.

In an example, the flow 900 includes operation 912, where the computer system determines a non-maximum suppression (NMS) score based on the mask score and the classification score. This operation is similar to operation 810.

In an example, the flow 900 includes operation 914, where the computer system selects a mask based on the quality score. This operation is similar to operation 812.

Figure 10:
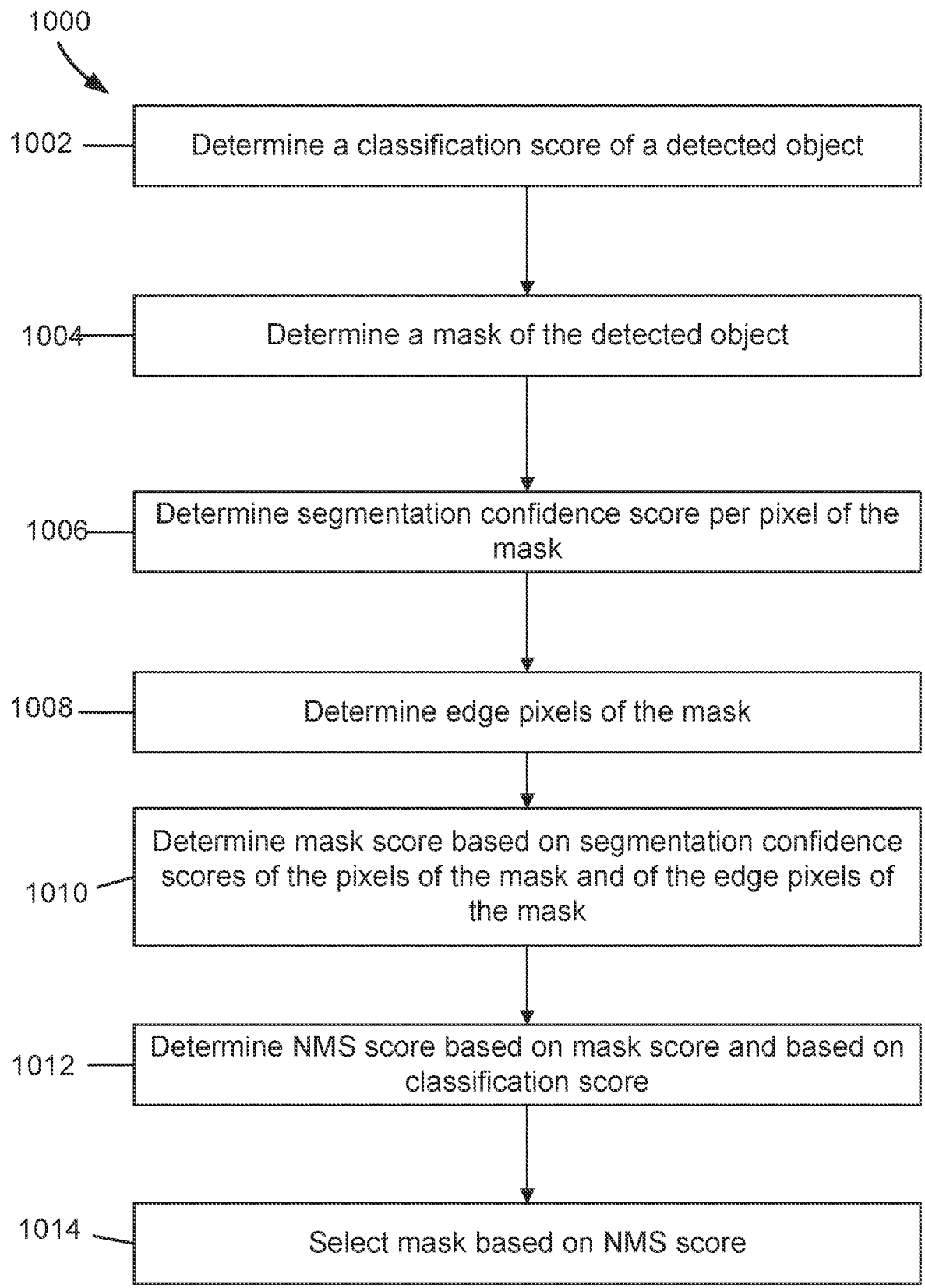
FIG. 10 illustrates an example of a flow for selecting a mask with respect to an image and using segmentation confidence scores of pixels of the mask.

FIG. 10 illustrates an example of a flow 1000 for selecting a mask with respect to an image and using a segmentation confidence score and edges of the image. In an example, the flow 1000 includes operation 1002, where a computer system (e.g., the computer system 218) determines a classification score of a detected object. This operation is similar to operation 802.

In an example, the flow 1000 includes operation 1004, where the computer system determines a mask of the detected object. This operation is similar to operation 804.

In an example, the flow 1000 includes operation 1006, where the computer system determines segmentation confidence scores for each pixel within the determined mask. This operation is similar to operation 806.

In an example, the flow 1000 includes operation 1008, where the computer system determines the edge pixels of the determined mask. For example, the edge pixels belong to the boundary(ies) of the mask.

In an example, the flow 1000 includes operation 1010, where the computer system determines the mask score based on the segmentation scores of each pixel of the determined mask and of the edge pixels of the determined mask. For example, the computer system can average the segmentation confidence scores of the pixels of the determined mask to generate a first score, average the segmentation confidence scores of the edge pixels to generate a second score, and multiply the first score and the second score to generate the mask score.

In an example, the flow 1000 includes operation 1012, where the computer system determines a NMs score based on the mask score and the classification score. This operation is similar to operation 810.

In an example, the flow 1000 includes operation 1014, where the computer system selects a mask based on the quality score. This operation is similar to operation 812.

Figure 11:
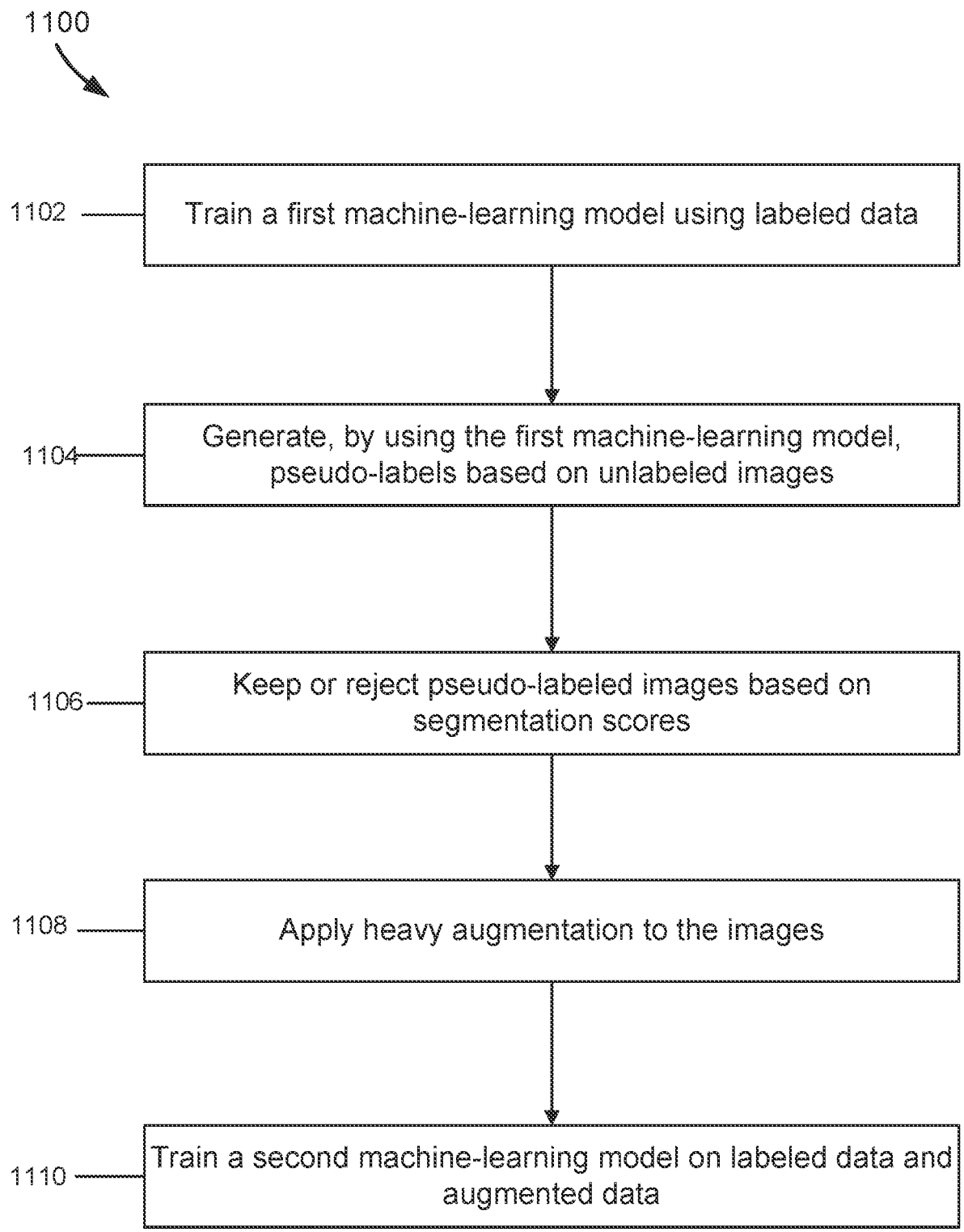
FIG. 11 illustrates an example of a flow for training a first machine-learning model and a second machine-learning model using heavy augmentation.

FIG. 11 illustrates an example of a flow 1100 for training a first machine-learning model and a second machine-learning model using heavy augmentation. In an example, the flow 1100 includes operation 1102, where a computer system (e.g., the computer system 218) trains a first machine-learning model using labeled data. The first machine-learning model can be similar to the first machine-learning model 602 of FIG. 6, and the labeled data may originate from the labeled images 606 of FIG. 6 and can include the labeled images 606 and their labels 607. The computer system can input the labeled data to the first machine-learning model. By doing so, the first machine-learning model, upon training, can be used as a teacher model during the training of a second machine-learning model according to a semi-supervised learning technique.

In an example, the flow 1100 includes operation 1104, where the computer system generates, by using the first machine-learning model, pseudo-labels based on unlabeled images, such as pseudo-labels 610 based on the unlabeled images 608 of FIG. 6. The first machine-learning model, subsequent to being trained, may receive the unlabeled images as an input and generate pseudo-labels associated with the unlabeled images as an output. The pseudo-labels may include estimated masks of the unlabeled images.

In an example, the flow 1100 includes operation 1106, where the computer system keeps or rejects pseudo-labeled images based on segmentation scores. The computer system can determine segmentation confidence scores of the pseudo-labels. For example, each pseudo-label indicates a mask. Pixels of the mask are associated with segmentation confidence scores. A mask score can be generated based on these segmentation confidence scores as described in FIGS. 8-10. The computer system can filter the pseudo-labels by applying a threshold masks core. In an example, pseudo-labels having a mask score above the threshold mask score may be retained, and pseudo-labels having a mask score below the threshold mask score may be rejected or otherwise ignored.

In an example, the flow 1100 includes operation 1108, where the computer system applies heavy augmentation to the images. Heavy augmentation can involve applying or otherwise performing various operations including linear and non-linear distortions and/or combination of images, such as such as CutMix, Mixup, MixMatch, ReMixMatch, or other suitable heavy augmentation operations. Heavy augmentation may increase a complexity of the images used for training and may increase a quality of the resulting trained machine-learning model. The images having pseudo-labels or labels. The augmentations can be applied to the pseudo-label or labels too (e.g., to the corresponding max). As a result of the augmentation, the training dataset is increased to include the transformed images and the transformed labels.

Employing strong data augmentations can be a data-efficient method to train a robust instance segmentation model. Elastic transformations can be randomly applied to an original image. The elastic transformations can include a horizontal flip, a vertical flip, a brightness change, additive Gaussian noise, scale up, scale down (in multiple axes), affine transformations with shear and rotation, a piece-wise affine transformation, or other suitable elastic transformations. Unlike image classification, instance segmentation labels are affected by the heavy augmentation as each object's shape can change. Therefore, segmentation labels can also be transformed accordingly.

During training, mixing step also occurs with CutMix. Formally, two images $x_1$ and $x_2$ and associated instance segmentation labels $y_1$ and $y_2$ are mixed with their convex combination as follows:

$$x_{min}=ax_1+(1-a)x_2$$

$$y_{min}=ay_1+(1-a)y_2$$

For instance segmentation, a is defined as a binary mask image where the mask is a rectangle with randomized parameters (e.g. width, height, and rotation angle). After mixing labels, segmentation masks may be cropped or removed, hence the list of objects in the image is updated accordingly. Also, the bounding box of each object can be corrected to fit the new mask and its class label can be preserved. The mixing step can be performed after applying heavy augmentations to the original image. Various techniques of augmentation can be used. Examples can include heavy, CutMix, Focal, Jitter, Soft Masks, stochastic weight averaging, long, or other suitable examples.

Heavy augmentation can refer to the heavy augmentation which includes strong transformations like horizontal flip, vertical flip, brightness multiply, brightness add, additive Gaussian noise, scale up, scale down (e.g., in various axes), affine transformations with shear and rotation, a piece-wise affine transformation, and other suitable strong transformations. Augmented images can be pre-generated offline due to the computational cost.

CutMix is used herein for instance segmentation. A binary rectangular mask can be chosen with randomly chosen parameters (e.g., width and height of the rectangle and a rotation angle), and one masked region of the image is cropped and pasted to the second image. Segmentation and bounding box labels can be updated accordingly, and each object's class label can be preserved.

Focal can refer to the use of a focal loss for a classification portion of instance segmentation to ameliorate any deleterious effects of class imbalance. The focal loss can be used instead of a cross-entropy loss in classification, for example.

Jitter augmentation may refer to adding random scalar values to the mean and standard deviation of RGB channel values which are used for normalizing an input to the MasQ R-CNN model. Subtraction of the mean (e.g., by color channel) and dividing by the standard deviation (by color channel) can be a form of standardization and can generally aid in the optimization of the network (shown below), where $I_{(x,y)}$ (r, g, b) represents the RGB pixel values at (x, y) spatial location of the image. The mean $\mu$(r, g, b) and standard deviation $\sigma$(r, g, b) are calculated from the training dataset. By adding the proposed jitter, $\delta_\mu$ and $\delta_\sigma$ uniformly drawn from $-15\%$ to $15\%$, the network should be invariant to small ($+/-15\%$) changes in the values.

$$I'_{x,y}(r, g, b) = \frac{I_{x,y}(r, g, b) - (1 + \delta_\mu) * \mu(r, g, b)}{(1 + \delta_\sigma) * \sigma(r, g, b)}$$

For classification models, the use of soft labels may increase performance by improving generalization ability and reducing overfitting. Soft labels can adjust a target for classification from being 1 to $1-\epsilon$. This can help prevent the tendency of logits to be $\pm\infty$ for the sake of reaching the target of 1. For instance segmentation, there are multiple ways to add soft labels. Soft-labels can be added to the mask output and not to the classification output, hence the mask targets are changed from 1 to $1-\epsilon$ ($\epsilon=0.1$).

Stochastic weight averaging can be a techniques of averaging network weights in the vicinity of near-solutions. Stochastic weight averaging can average network weights during training, generally towards the end of training when stochastic gradient descent (SGD) has settled into a minimum. The averaging procedure can allow the final solution to be close to the center of the basin instead of at its periphery (which occurs from the nature of SGD). Stochastic weight averaging can lead to solutions that can be defined by two properties: 1) the final weights provide better performance and 2) the final solution is in a flatter region of solution space (implying better generalization and less sensitivity to a change in the weights).

Long can refer to training for considerably longer, for example 300 epochs instead of 80. The learning rate schedule can be adjusted accordingly. For the focal loss training, the lower learning rate regions can be removed based on inspection of the validation mean average precision. It should be noted that training for more epochs may be conditional on using augmentations.

Once a model is deployed to production, a large number of images can be collected continuously. A semi-supervised learning procedure can be used for instance segmentation to leverage such unlabeled data for model training. A pseudo-label can be generated for each unlabeled sample by aggregating inference outputs from weakly augmented images. Then, annotated and pseudo-labeled samples can be mixed during training for stronger data augmentation.

Semi-supervised learning can be used for instance segmentation, and optimizing data augmentation and other training strategies can be performed. Semi-supervised learning can require large amounts of computational costs for generating a large number of pseudo-labels and additional training time for a student model with such data. A training process can be optimized for production by combing heavy augmentation, CutMix, meanstd jitter, SWA, or other augmentation techniques.

In an example, the flow 1100 includes operation 1110, where the computer system trains a second machine-learning model using labeled data and augmented data. The computer system can input the labeled data and the augmented data into the second machine-learning model, which can be similar to the second machine-learning model 604 of FIG. 6.

Figure 12:
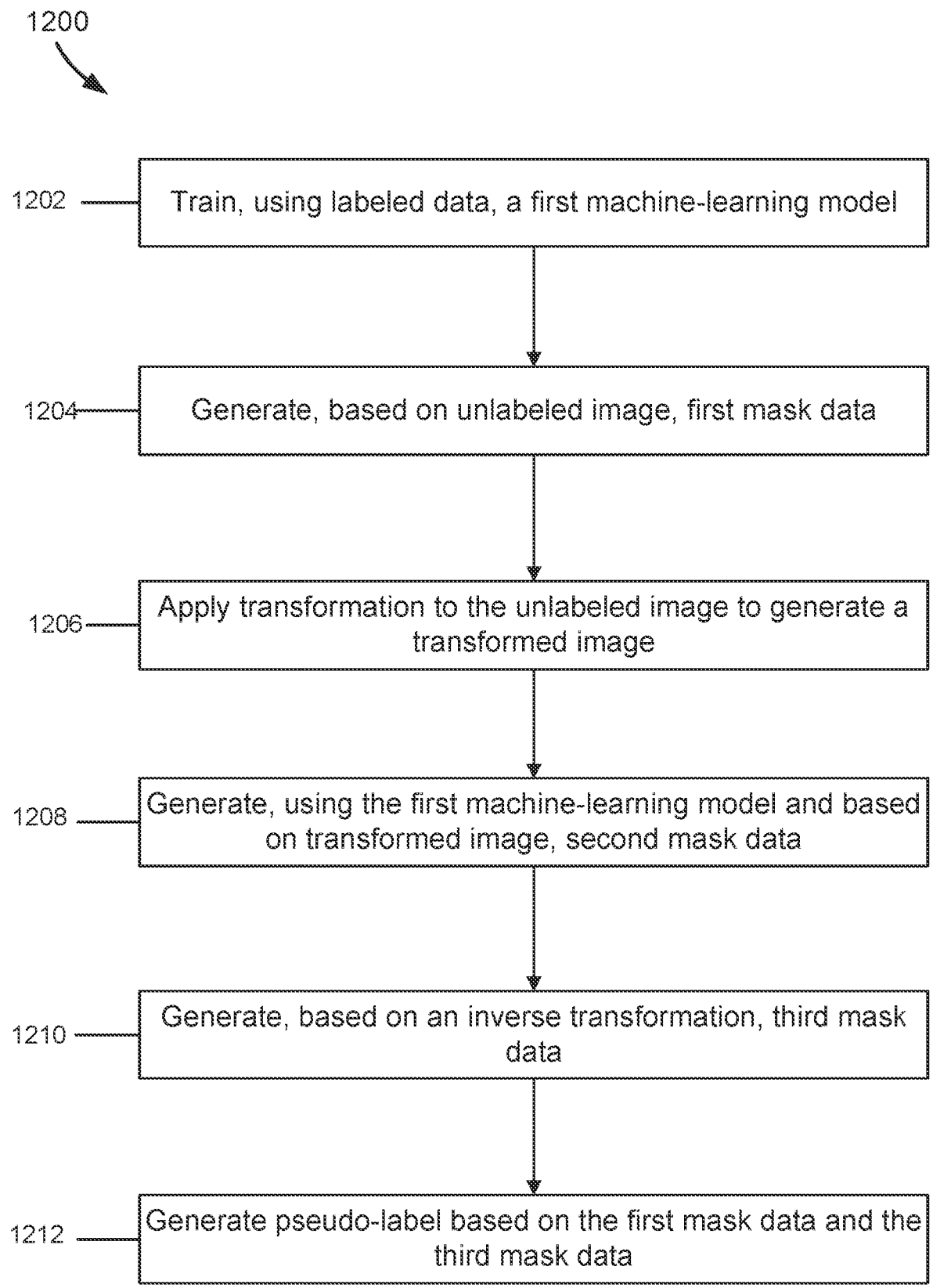
FIG. 12 illustrates an example of a flow for generating pseudo-labels of an image.

FIG. 12 illustrates an example of a flow 1200 for generating pseudo-labels of an image. In an example, the flow 1200 includes operation 1202, where a computer system (e.g., the computer system 218) trains a first machine-learning model using labeled data. The first machine-learning model can be similar to the first machine-learning model 602 of FIG. 6, and the labeled data may originate from the labeled images 606 of FIG. 6 and include the labeled images 606 and their labels 607. The computer system can input the labeled data to the first machine-learning model.

In an example, the flow 1200 includes operation 1204, where the computer system generates, based on an unlabeled image, first mask data. In an example, the first mask data may indicate a bounding box that may include pixels that show a detected object. The pixels that can be used to determine various scores (e.g., segmentation confidence scores, a mask score, etc.). The first mask data can be generated by inputting the unlabeled image to the first machine-learning model, where the output of this model includes the first mask data.

In an example, the flow 1200 includes operation 1206, where the computer system applies a transformation to the unlabeled image to generate a transformed image. In an example, the transformation, referred to herein as a weak augmentation, may modify the unlabeled image by relatively a smaller amount than a heavy augmentation. For instance, the transformation may be a linear transformation, such as a rotation, a reflection, and/or a translation of the unlabeled image.

In an example, the flow 1200 includes operation 1208, where the computer system generates, using the first machine-learning model and based on the transformed image, second mask data. The second mask data may include pixels of the transformed image that show the object subsequent to the transformation performed with respect to the operation 1206. The second mask data can be generated by inputting the transformed image to the first machine-learning model, where the output of this model includes the second mask data.

In an example, the flow 1200 includes operation 1210, where the computer system generates, based on an inverse transformation, third mask data. The inverse transformation is an inverse of the transformation applied at operation 1210, such that original, unlabeled image can be re-generated from the transformed image. The inverse transformation is applied to the second mask data to generate the third mask data. As such, the third mask data may indicate a set of pixels that may be similar to (but possibly not identical to) the set of pixels indicated by the first mask data.

In an example, the flow 1200 includes operation 1212, where the computer system generates pseudo-label based on the first mask data and on the third mask data. In an example, the computer system can combine the first mask data and the third mask data to define a mask, and the pseudo-label corresponds to this mask (e.g., by aggregating the first mask data and the third mask data to define a boundary of the mask).

Multiple of such pseudo-labels can be generated from the same unlabeled image. For example, "K" (an integer greater than one) weak augmentations (ninety-degree rotations and reflections) can be applied to the unlabeled image and the predictions can be aggregated to create a single pseudo-label.

After performing inference on K-weakly augmented images, $T_k^{+1}(x)(k \in [K])$ an inverse transformation, $T_k^{-1}(*)$, can be performed with respect to each augmentation (e.g. inverse rotation or flipping) to the output mask predictions. Using the output from the original image as an anchor, each of the K predictions (inverse transformed) can be iterated through. For each mask prediction (of an object) in the output, an IoU can be determined with the mask anchor. If the highest IoU score among the overlapped masks is greater than 0.5 (or some other threshold value), this can be considered a mask match, while constraining the number of matched instance to be at most one. For all the matched instances from the K+1 outputs including the anchor, the class label can be calculated by taking a majority vote and the confidence score by averaging. For mask predictions, the pixel-wise mean can be binarized using a threshold of 0.25 or other suitable threshold value. Each aggregated binary mask can be transformed into a polygon with some simplification processing to reduce the number of sides.

After aggregating the inferences from weakly augmented images, images or segments with low quality (or mask score) can be filtered out since such a pseudo-label may affect the stability of training the second machine-learning (student) model. The scores for the segments and images can be obtained in several ways. The output confidence scores of the MasQ R-CNN can be aggregated during the pseudo-labeling step as it captures both classification and segmentation quality. A score for semi-supervised learning can be defined by the consensus of the mask predictions on K-weakly augmented images using various techniques (e.g., described below).

A semi-supervised learning score can be used to filter out low-quality or less-confident pseudo-labeled samples before training a first machine-learning (student) model. The semi-supervised learning score can be considered high if an instance is consistently segmented by a model regardless of weak augmentations applied to the image. A sample with a low semi-supervised learning score might indicate a weakness of the respective model.

For each inference on $k^{th}$ weak augmentations, create an image m k by assigning a value to each pixel if it is a part of any detected instance's mask (e.g., an aggregated binary image of the detected instances' masks). $m_0$ can refer to the original image. The binary images can be summed:

$$M = \sum_{k=0}^{K} m_k.$$

If a pixel is segmented by all inference outputs, the value becomes K+1. The IoU of two binary images $M^1$ and $M^2$ can be determined: $M_{i,j}^1 = I_{(M_{i,j}>0)}$, and $M_{i,j}^2 = I_{(M_{i,j}=K+1)}$, where $I_{(*)}$ is an indicator function, and (i, j) is a spatial location in the image. The score per instance can be obtained by computing the IoU per segment. Optionally, a consensus map $M^C$ can be also generated by normalizing its pixel values as $$M_{i,j}^c = \frac{M_{i,j}}{K+1} * 255.$$

Figure 13:
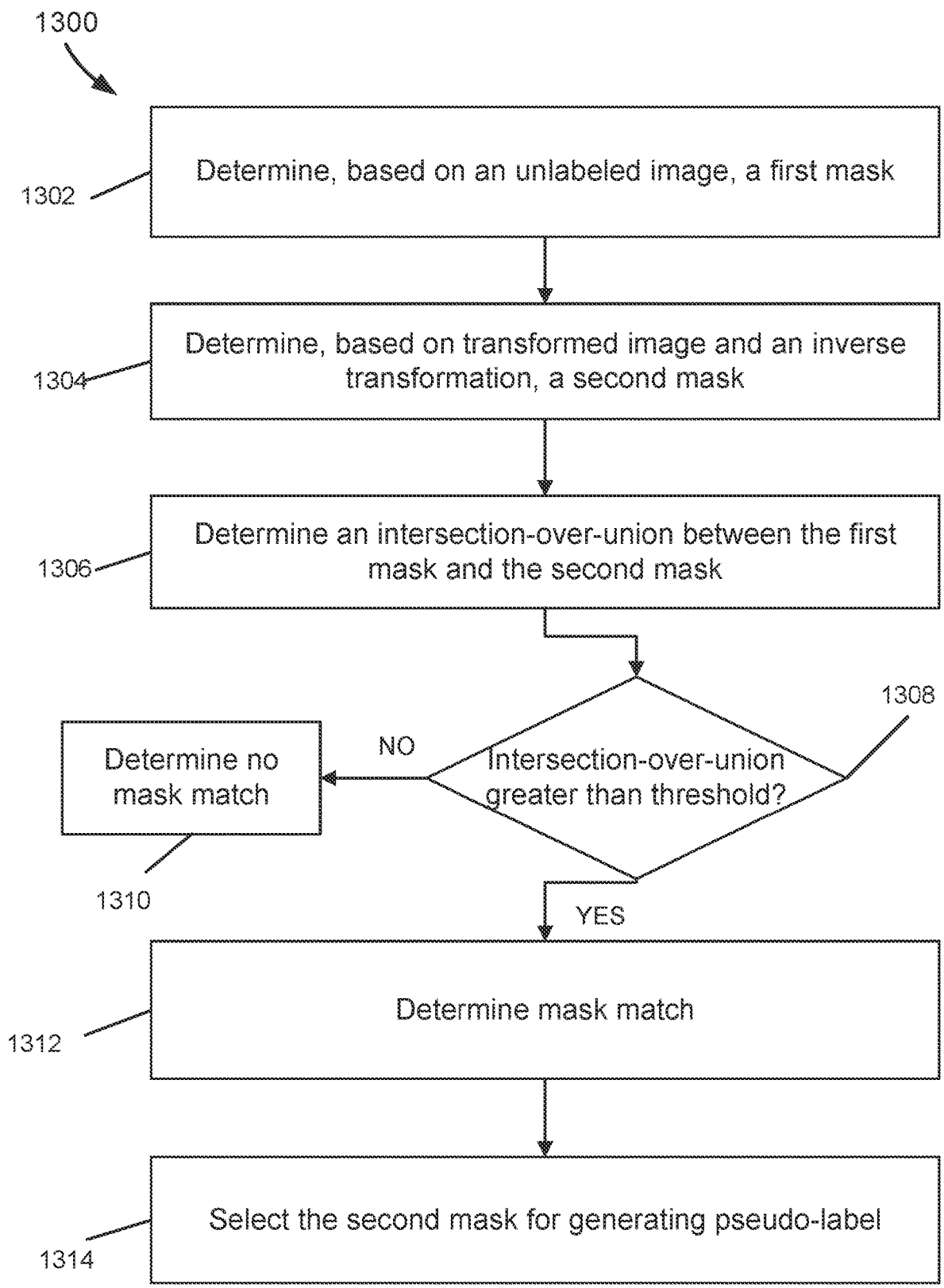
FIG. 13 illustrates an example of a flow for determining a mask match for an image.

FIG. 13 illustrates an example of a flow 1300 for determining a mask match for an image. The flow 1300 can be implemented to determine whether mask data is to be retained or filtered out before generating a corresponding pseudo-label. As such, operations of the flow 1300 can be implemented as sub-operations of the flow 1200 (e.g., in part as sub-operations following operations 1210 to determine whether operation 1212 is to be performed). In this case, the second mask data referred in FIG. 13 corresponds to the third mask data of FIG. 12. In an example, the flow 1300 includes operation 1302, where a computer system (e.g., the computer system 218) determines a first mask based on an unlabeled image. In an example, the computer system can use the first machine-learning model to determine the first mask. The first mask can include (or otherwise correspond to) a bounding box or a set of pixels that show a detected object within the unlabeled image. This operation can be similar to operation 1204.

In an example, the flow 1300 includes operation 1304, where the computer system determines a second mask based on a transformed image and on an inverse transformation. This operation can be similar to operations 1206-1208.

In an example, the flow 1300 includes operation 1306, where the computer system determines an IoU value between the first mask and the second mask. The IoU value may be used as a threshold value or in related thresholding operations.

In an example, the flow 1300 includes operation 1308, where the computer system determines whether the IoU value determined with respect to the operation 1306 is above or below a threshold. The threshold can be predetermined or can be dynamic and may, in some examples, range between zero and one. If the computer system determines that the IoU value is not above the threshold, the computer system may proceed to operation 1310, where the computer system determines that there is not a mask match between the first mask and the second mask. Accordingly, no pseudo-label may be generated in this case. If the computer system determines that the IoU value is above the threshold, the computer system may proceed to operation 1312, where the computer system determines a mask match between the first mask and the second mask.

In an example, the flow 1300 includes operation 1314, where the computer system generates a pseudo-label based on the second mask. In response to determining that the first mask and the second mask are mask matches, the computer system can use the second mask to generate the pseudo-label. The pseudo-label can indicate the pixels that belong to the second mask.

Figure 14:
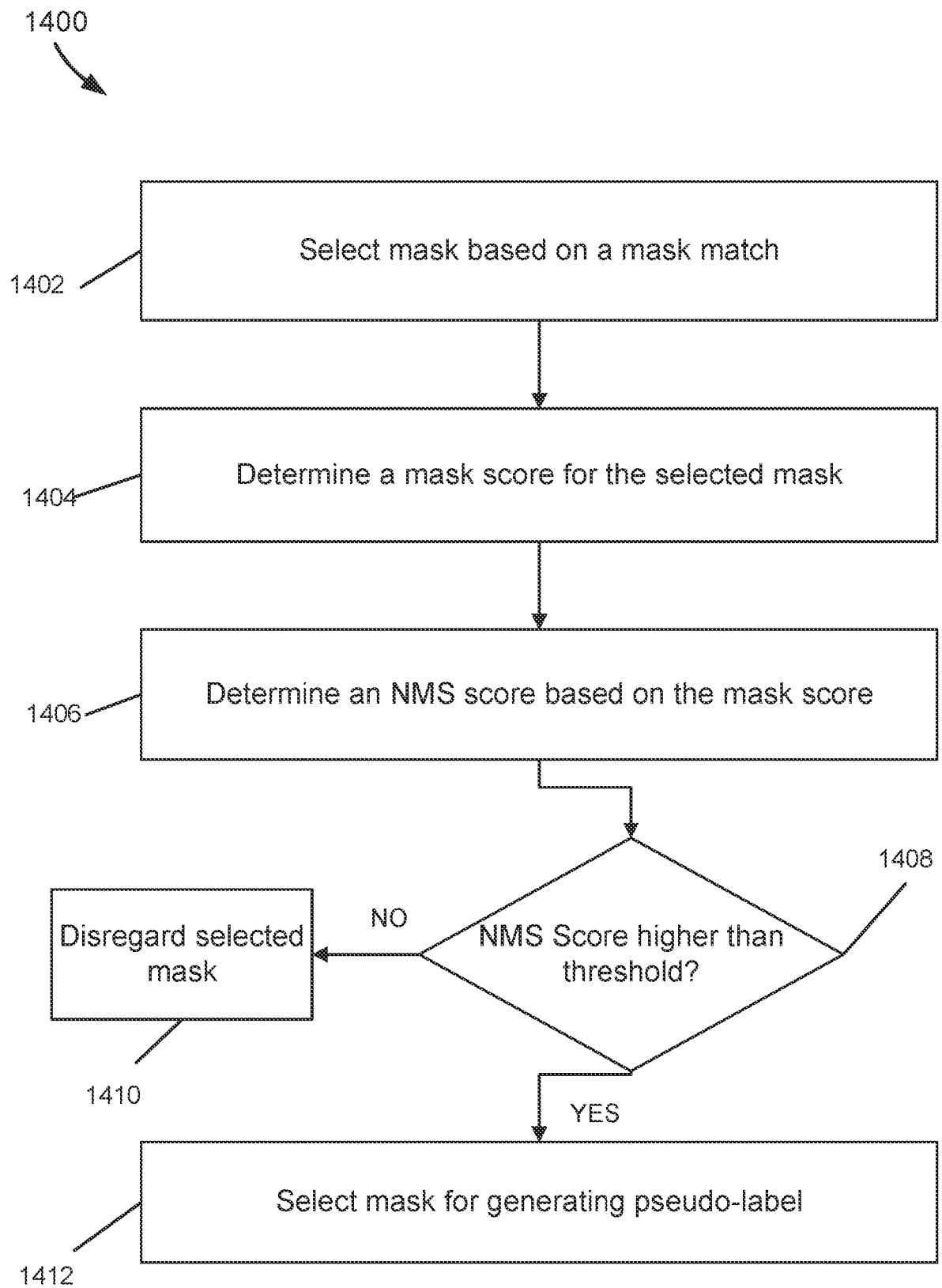
FIG. 14 illustrates an example of a flow for selecting a mask for determining a pseudo-label.

FIG. 14 illustrates an example of a flow 1400 for selecting a mask for determining a pseudo-label. In an example, the flow 1400 includes operation 1402, where a computer system (e.g., the computer system 218) selects a mask based on a mask match. In an example, the computer system can select the mask using the operations described with respect to the flow 1300.

In an example, the flow 1400 includes operation 1404, where the computer system determines a mask score for the selected mask. The mask score may be similar to the mask quality score 408 described with respect to FIG. 4. For example, the computer system can determine segmentation confidence scores of pixels included in an image from which the mask is generated, and can determine the mask score for the mask based on the segmentation confidence scores (e.g., as described with respect to FIGS. 8-10).

In an example, the flow 1400 includes operation 1406, where the computer system determines a quality score based on the mask score. The quality score determined with respect to the operation 1406 may be similar to the quality score 410 described with respect to FIG. 4 or the quality score described with respect to the operation 810. In an example, the computer system can determine a classification score based on the image and can determine the quality score by multiplying the classification score (e.g., described with respect to the operation 802) and the mask score (e.g., determined with respect to the operation 1404). The quality score can be used as a threshold or can be used in subsequent thresholding operations.

In an example, the flow 1400 includes operation 1408, where the computer system determines whether the quality score is higher than a threshold value. The threshold value can be predefined or dynamic. If the computer system determines that the quality score is lower than the threshold value, the computer system may process to operation 1410, where the computer system disregards the selected mask and may proceed to a subsequently selected mask. If the computer system determines that the quality score is higher than the threshold value, then the computer system may proceed to operation 1412, where the computer system selects the mask for generating the pseudo-label.

Figure 15:
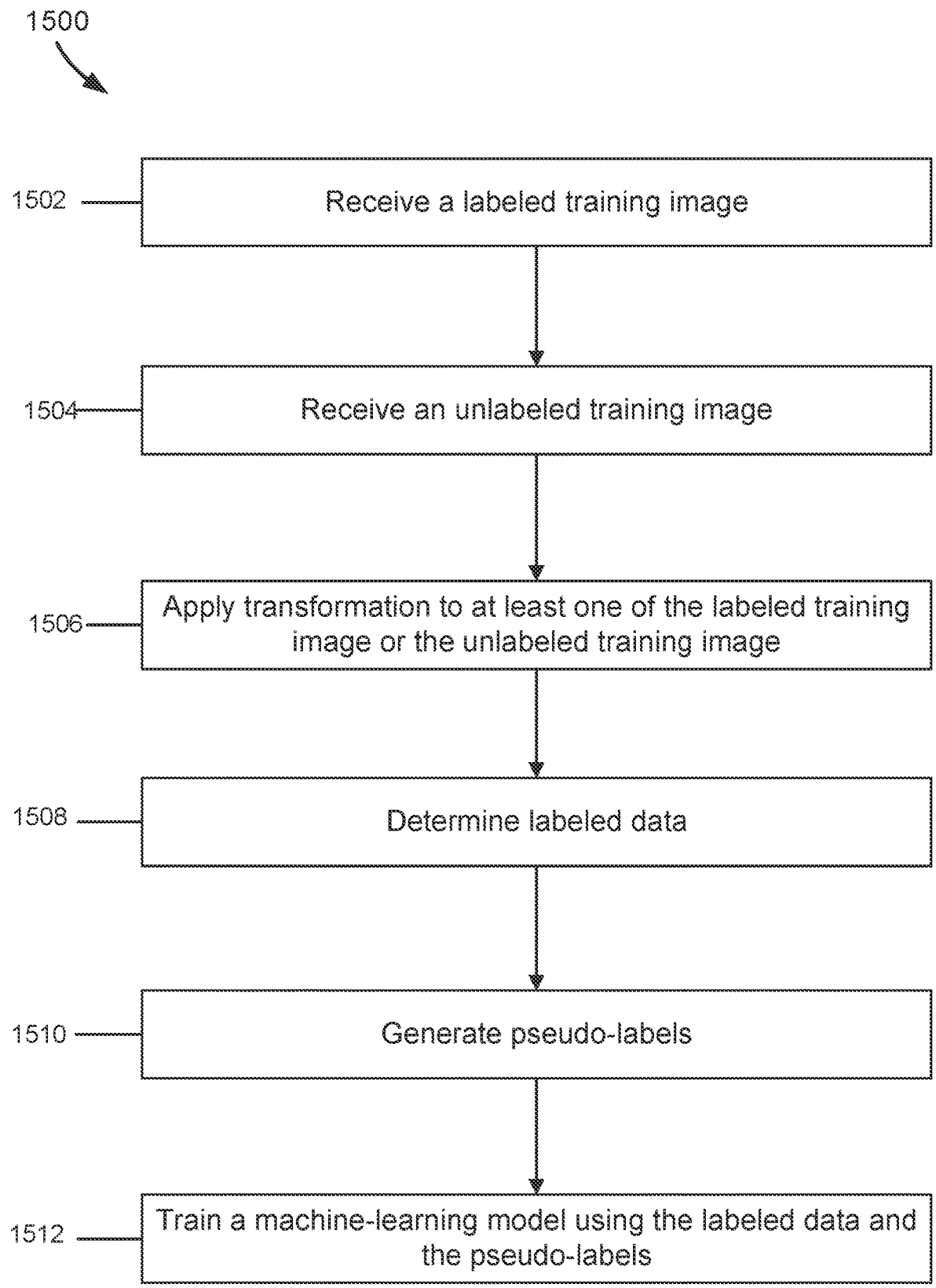
FIG. 15 illustrates an example of a flow for training a machine-learning model using pseudo-labels.

FIG. 15 illustrates an example of a flow 1500 for training a machine-learning model using pseudo-labels. In an example, the flow 1500 includes operation 1502, where a computer system (e.g., the computer system 218) receives a labeled training image. The labeled training image may be similar to one or more of the labeled images 606 of FIG. 6.

In an example, the flow 1500 includes operation 1504, where the computer system receives an unlabeled training image. The unlabeled training image may be similar to one or more of the unlabeled images 608 of FIG. 6.

In an example, the flow 1500 includes operation 1506, where the computer system applies a transformation at least to one of the labeled training images or the unlabeled training image. The transformation can include one or more transformation operations (e.g., those described with respect to the operations 1206 and 1210).

In an example, the flow 1500 includes operation 1508, where the computer system determines labeled data. The labeled data corresponds to the labeled training image.

In an example, the flow 1500 includes operation 1510, where the computer system generates pseudo-labels. The pseudo-labels can be generated, for example, by a teacher machine-learning model based on the unlabeled training image and the transformed images.

In an example, the flow 1500 includes operation 1512, where the computer system trains a machine-learning model (e.g., a student machine-learning model) using the labeled data and the pseudo-labels. For example, the labeled training images, their labels, the unlabeled training image, its pseudo label, any transformed image and its pseudo-label can be input to this machine-learning model during a training session.

The MasQ R-CNN model can achieve a near-100% classification recall per class on our test set, so segmentation performance may mostly contribute to the overall improvement. The MasQ R-CNN can resolve the issue of Mask R-CNN providing low quality masks when packages are overlapping by correctly detecting and segmenting the surface of an unoccluded package. The proposed mask quality score can capture complexity of detection and the corresponding quality of the predicted mask. The MasQ R-CNN can improve mAP and sAF1 by at least 2% over those of the Mask R-CNN. The quality of segmentation may also be better in terms of 2D pick point accuracy: the average $\ell_2$ distance of centroids can be decreased by 0.41 pixels. For example, the MasQ R-CNN can achieve 0.05 complementary cumulative distance function at 12.5 pixels, which is 2 pixels lower than the original Mask R-CNN.

MasQ R-CNN models trained with semi-supervised learning can further improve the performance of other suitable metrics. Even the simplest semi-supervised learning model trained without heavy augmentation and filtering steps can be characterized by 1.73% additional improvement in mAP. Applying heavy augmentations to the pseudo-labeled images can further improve the performance by 2.1% mAP which shows the effectiveness of both the semi-supervised learning approach and the strong augmentations in instance segmentation. Efforts to pre-filter the data based on per-image and per-segment scores can result in stabilization of training. A model trained with semi-supervised learning may tend to over-fit the validation dataset much less than when using the labeled dataset on its own, which can illustrate the regularization effect of semi-supervised learning.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more computer-readable storage media storing instructions that, upon execution on a system, configure the system to perform operations comprising:

training, by at least using labeled data, a first machine learning model, the labeled data indicating a first mask associated with a first object present in a first training image, the first object associated with an item package classification;

generating, by at least using a second training image as input to the first machine learning model, a first pseudo-label indicating a second mask associated with a second object detected by the first machine learning model in the second training image, the second object associated with the item package classification;

generating, by at least using a transformation, a transformed image of the second training image;

determining, based at least in part on the transformation, a second pseudo-label indicating a third mask that is detected in the transformed image and that corresponds to the second mask;

training, by at least using the labeled data and the second pseudo-label, a second machine learning model;
receiving a third image that shows an item package;
determining, by at least using the third image as input to the second machine learning model, a fourth mask associated with a third object detected in the third image, the third object corresponding to the item package; and
causing a manipulation by a robotic manipulator of the item package based at least in part on the fourth mask.

2. The one or more computer-readable storage media of claim 1, wherein the operations further comprise:
applying a rotation to the second training image, wherein the second training image is an unlabeled training image, the transformation comprises the rotation, and the transformed image is a rotated image of the unlabeled training image;
generating, by using the unlabeled training image as input to the first machine learning model, first mask data;
generating, by using the rotated image as input to the first machine learning model, second mask data;
generating third mask data by applying an inverse rotation to the second mask data; and
generating the first pseudo-label based at least in part on the first mask data and the third mask data.

3. The one or more computer-readable storage media of claim 2, wherein the operations comprise:
determining a segmentation confidence score per pixel of the second mask;
determining, based at least in part on the determined segmentation confidence scores, a mask score indicating a quality of the second mask; and
selecting, based at least in part on the mask score, the first pseudo-label for the training of the second machine learning model.

4. The one or more computer-readable storage media of claim 1, wherein the operations further comprise:
determining a classification score indicating a likelihood that the third object is associated with the item package classification;
determining a segmentation confidence score per pixel of the fourth mask;
determining, based at least in part on the determined segmentation confidence scores, a mask score indicating a quality of the fourth mask;
determining a quality score of the fourth mask based at least in part on the classification score and the mask score; and
selecting, based at least in part on the quality score, the fourth mask from a plurality of masks determined by the second machine learning model for the third image.

5. A computer-implemented method, comprising:
generating, by at least using a first training image as input to a first machine learning model, a first pseudo-label indicating a first mask associated with a first object detected by the first machine learning model in the first training image;
generating, by at least using a transformation, a transformed image of the first training image;
determining, based at least in part on the transformation, a second pseudo-label indicating a second mask that is detected in the transformed image and that corresponds to the first mask; and
training, by at least using the second pseudo-label, a second machine learning model, wherein a third mask associated with a second object is detected by the second machine learning model based at least in part on a second image, wherein the second image is input to the second machine learning model and comprises the second object.

6. The computer-implemented method of claim 5, further comprising:
training, by at least using labeled data, the first machine learning model, the labeled data indicating a fourth mask associated with a third object present in a third training image, wherein the first object, the second object, and the third object are associated with an item package classification.

7. The computer-implemented method of claim 5, further comprising:
receiving the second image that shows an item package;
determining, by at least using the second image as input to the second machine leaning model, the third mask associated with the second object, the second object corresponding to the item package; and
causing a manipulation by a robotic manipulator of the item package based at least in part on the third mask.

8. The computer-implemented method of claim 7, further comprising:
determining a first segmentation confidence score for a first pixel of the third mask;
determining a second segmentation score for a second pixel outside of the third mask;
determining, based at least in part on the first segmentation confidence score and the second segmentation score, a mask score indicating a quality of the third mask; and
selecting, based at least in part on the mask score, the third mask from a plurality of masks determined by the second machine learning model for the second image.

9. The computer-implemented method of claim 5, further comprising:
determining a first segmentation confidence score for a first pixel of the third mask, the first pixel located in an edge of the third mask;
determining, based at least in part on the first segmentation confidence score, a mask score indicating a quality of the third mask; and
selecting, based at least in part on the mask score, the third mask from a plurality of masks determined by the second machine learning model for the second image.

10. The computer-implemented method of claim 9, further comprising:
determining a classification score indicating a likelihood that the second object is associated with an object classification;
determining a segmentation confidence score per edge pixel of the third mask;
determining, based at least in part on the determined segmentation confidence scores, a mask score indicating a quality of the third mask;
determining a quality score of the third mask based at least in part on the classification score and the mask score; and
selecting, based at least in part on the quality score, the third mask from a plurality of masks determined by the second machine learning model for the second image.

11. The computer-implemented method of claim 5, further comprising:
determining a classification score indicating a likelihood that the second object is associated with an object classification;
determining a first segmentation confidence score per edge pixel of the third mask;

determining a second segmentation confidence score per pixel of the third mask;

determining, based at least in part on the determined first segmentation confidence scores and the determined second segmentation confidence scores, a mask score indicating a quality of the third mask;

determining a quality score of the third mask based at least in part on the classification score and the mask score; and selecting, based at least in part on the quality score, the third mask from a plurality of masks determined by the second machine learning model for the second image.

12. The computer-implemented method of claim 5, wherein the transformation and the transformed image are a first transformation and a first transformed image, respectively, and wherein the computer-implemented method further comprises:

generating, by at least using the first training image as input to the first machine learning model, first mask data;

generating, by at least using a second transformation, a second transformed image of the first training image;

generating, by at least using the second transformed image as input to the first machine learning model, second mask data;

generating third mask data by applying an inverse transformation to the second mask data; and generating the first pseudo-label based at least in part on the first mask data and the third mask data.

13. The computer-implemented method of claim 12, further comprising:

determining an intersection of union (IoU) between masks corresponding to the first mask data and the third mask data;

determining that the IoU is larger than a threshold value; and determining a match between the masks, wherein the first pseudo-label is further generated based at least in part on the match.

14. The computer-implemented method of claim 12, further comprising:

determining a segmentation confidence score per pixel of the first mask;

determining, based at least in part on the determined segmentation confidence scores, a mask score indicating a quality of the first mask; and selecting, based at least in part on the mask score, the first pseudo-label for the training of the second machine learning model.

15. A system comprising:

one or more processors; and one or more memory storing computer-readable instructions that, upon execution by the one or more processors, configure the system to:

generate, by at least using a first training image as input to a first machine learning model, a first pseudo-label indicating a first mask associated with a first object detected by the first machine learning model in the first training image;

generate, by at least using a transformation, a transformed image of the first training image;

determine, based at least in part on the transformation, a second pseudo-label indicating a second mask that is detected in the transformed image and that corresponds to the first mask; and train, by at least using the second pseudo-label, a second machine learning model, wherein a third mask associated with a second object is detected by the second machine learning model based at least in part on a second image, wherein the second image is input to the second machine learning model and comprises the second object.

16. The system of claim 15, wherein the execution of the computer-readable instructions further configure the system to:

train the first machine learning model by using labeled data, wherein the second machine learning model is trained by at least using the labeled data and the second pseudo-label.

17. The system of claim 16, wherein the transformed image is a first transformed image, and wherein the labeled data indicates a fourth mask in a labeled image, and wherein the execution of the computer-readable instructions further configure the system to:

generate, by at least using the transformation, a second transformed image of the labeled image; and determine, based at least in part on the transformation, a third label indicating a fifth mask that is present in the second transformed image and that corresponds to the fourth mask, wherein the second machine learning model is trained by at least using the third label and the second pseudo-label.

18. The system of claim 16, wherein the first training image is an unlabeled image, wherein the labeled data corresponds to a labeled image, wherein the transformed image is a first transformed image, and wherein the execution of the computer-readable instructions further configure the system to:

generate, by at least using the transformation, a second transformed image of the labeled image, wherein the second machine learning model is trained by at least using the first transformed image and the second transformed image.

19. The system of claim 18, wherein the execution of the computer-readable instructions further configure the system to:

generates a new training image based at least in part on the first transformed image and the second transformed image, wherein the second machine learning model is trained by at least using the new training image as input to the second machine learning model.

20. The system of claim 18, wherein the transformation comprises at least one of an image distortion or a cut-mix combination of images.

* * * * *

UNITED STATES PATENT AND TRADEMARK OFFICE
CERTIFICATE OF CORRECTION

Page 1 of 1

| | |
|---|---|
| PATENT NO. | : 11,961,281 B1 |
| APPLICATION NO. | : 17/545119 |
| DATED | : April 16, 2024 |
| INVENTOR(S) | : Taewan Kim, Jesse Norman Clark and Onkar Jayant Dabeer |

It is certified that error appears in the above-identified patent and that said Letters Patent is hereby corrected as shown below:

On the Title Page

Item [74] delete: "Kirkpatrick Townsend & Stockton LLP"
Add: Kilpatrick Townsend & Stockton LLP Signed and Sealed this
Twentieth Day of May, 2025

Coke Morgan Stewart
*Acting Director of the United States Patent and Trademark Office*